United States Patent
Horie et al.

(10) Patent No.: US 6,809,052 B2
(45) Date of Patent: Oct. 26, 2004

(54) DIELECTRIC CERAMIC COMPOSITION AND ELECTRONIC DEVICE

(75) Inventors: Yuusaku Horie, Tokyo (JP); Yukie Nakano, Tokyo (JP); Kaori Masumiya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/342,283

(22) Filed: Jan. 15, 2003

(65) Prior Publication Data

US 2004/0038800 A1 Feb. 26, 2004

(30) Foreign Application Priority Data

Jan. 15, 2002 (JP) ........................................ 2002-006065

(51) Int. Cl.$^7$ ............................................ C04B 35/468
(52) U.S. Cl. ................ 501/138; 501/139; 252/62.3 BT; 361/321.3; 361/321.4; 361/321.5
(58) Field of Search ................................ 501/138, 139; 252/62.3 BT; 361/321.3, 321.4, 321.5

(56) References Cited

U.S. PATENT DOCUMENTS

| | | | | |
|---|---|---|---|---|
| 5,097,391 | A | * | 3/1992 | Nomura et al. .......... 361/321.4 |
| 6,058,005 | A | * | 5/2000 | Matoba et al. .......... 361/321.4 |
| 6,559,084 | B1 | * | 5/2003 | Fujikawa et al. ........... 501/139 |
| 6,628,502 | B2 | * | 9/2003 | Masumiya et al. ....... 361/321.2 |

FOREIGN PATENT DOCUMENTS

| | | |
|---|---|---|
| JP | A 4-206208 | 7/1992 |
| JP | A 5-97509 | 4/1993 |
| JP | A 6-5460 | 1/1994 |
| JP | A 9-171937 | 6/1997 |
| JP | A 9-171938 | 6/1997 |
| JP | A 10-12479 | 1/1998 |
| JP | A 10-83931 | 3/1998 |
| JP | A 10-172856 | 6/1998 |
| JP | A 10-223471 | 8/1998 |
| JP | A 10-308321 | 11/1998 |
| JP | A 10-330160 | 12/1998 |
| JP | A 11-92220 | 4/1999 |
| JP | A 11-322414 | 11/1999 |
| JP | A 11-322416 | 11/1999 |
| JP | A 2000-154057 | 6/2000 |
| JP | A 2001-31467 | 2/2001 |
| JP | A 2001-39765 | 2/2001 |
| JP | A 2001-143955 | 5/2001 |
| JP | A 2001-192264 | 7/2001 |
| JP | A 2001-230148 | 8/2001 |
| JP | A 2001-230149 | 8/2001 |
| JP | A 2001-230150 | 8/2001 |
| JP | A 2001-240466 | 9/2001 |
| JP | A 2002-20166 | 1/2002 |
| JP | A 2002-20167 | 1/2002 |
| JP | A 2002-87880 | 3/2002 |

OTHER PUBLICATIONS

Xue et al, "The influence of ionic radii on the incorporation of trivalent dopants into BaTiO3", Nov. 1988.*

* cited by examiner

Primary Examiner—David Brunsman
(74) Attorney, Agent, or Firm—Oliff & Berridge, PLC

(57) ABSTRACT

A dielectric ceramic composition, comprising a main component including barium titanate, a fourth subcomponent including an oxide of R1 (note that R1 is at least one kind selected from a first element group composed of rare-earth elements having a effective ionic radius of less than 108 pm when having a coordination number of nine), and a fifth subcomponent including an oxide of R2 (note that R2 is at least one kind selected from a second element group composed of rare-earth elements having a effective ionic radius of 108 pm to 113 pm when having a coordination number of nine). According to the composition, a dielectric ceramic composition having excellent reducing resisting property at firing, excellent temperature dependence of capacitance after firing, and improved accelerated lifetime of insulation resistance can be provided.

71 Claims, 12 Drawing Sheets

SAMPLE 24

SAMPLE 18

DIELECTRIC CERAMIC COMPOSITION AND ELECTRONIC DEVICE

BACKGROUND OF THE INVENTION

1. Field of the Invention

The present invention relates to a dielectric ceramic composition used, for example, as a dielectric layer of a multilayer ceramic capacitor and an electronic device using the dielectric ceramic composition as a dielectric layer.

2. Description of the Related Art

A multilayer ceramic capacitor as an example of electronic devices is produced by alternately stacking, for example, ceramic green sheets made by a predetermined dielectric ceramic composition and internal electrode layers having a predetermined pattern, then making the same one body to obtain a green chip, and simultaneously firing the green chip. The internal electrode layers of the multilayer ceramic capacitor are made to be one body with ceramic dielectrics by firing, so it has been necessary to select materials not reacting with ceramic dielectrics. Therefore, inevitably, platinum, palladium and other precious metals have been conventionally used as materials for composing the internal electrode layers.

While, in recent years, a dielectric ceramic composition wherein nickel and other inexpensive base metals can be used has been developed and a wide reduction of the costs has realized.

In recent years, demands for compact electronic devices have become strong as electronic circuits become higher in density, and multilayer ceramic capacitors have rapidly become more compact and gained a larger capacitance. Along therewith, a thickness per one dielectric layer in a multilayer ceramic capacitor has become thinner, so a dielectric ceramic composition capable of maintaining its reliability as a capacitor even with thin layers has been desired. Particularly, when making midvoltage capacitors used with a high rated voltage compact and high capacitance, very high reliability is required to a dielectric ceramic composition.

The present inventors have proposed a dielectric ceramic composition disclosed in the patent articles 1 and 2, etc. as techniques capable of using base metals as materials to compose internal electrodes, and by which a temperature dependence of a capacitance satisfies the X7R characteristic (−55 to 125° C., ΔC=±15% or less) of the EIA Standards. All of the techniques were to improve an accelerated lifetime of insulation resistance (IR) by adding $Y_2O_3$. However, further improvement of reliability has been desired in the circumstance where capacitors rapidly become more compact and obtain a larger capacitance.

On the other hand, there is known a dielectric ceramic composition, for example, disclosed in the patent article 3 as another technique satisfying the X7R characteristic.

The above dielectric ceramic compositions are those obtained by adding an oxide of at least one kind of rare-earth elements, Sc and Y, and an oxide of at least one kind of rare-earth elements, Gd, Tb and Dy to barium titanate. Namely, the technique disclosed in the patent article 3 is to improve an accelerated lifetime of insulation resistance by satisfying the X7R characteristic of the EIA Standards by adding oxides of at least two kinds of rare-earth elements selected from each of freely divided two element groups to barium titanate.

In the technique disclosed in the patent article 3, however, since the accelerated lifetime of the insulation resistance becomes short after firing when trying to satisfy the X7R characteristic, so there was a problem of keeping balance of the X7R characteristic and the lifetime. Moreover, along with attaining a further compact size and a larger capacitance, a dielectric loss (tan δ) becomes large and a DC bias and other reliability are liable to decline, so improvements have been desired.

Particularly, when trying to use as a material of a midvoltage multilayer ceramic capacitor having a high rated voltage, it was necessary to thicken at least 15 μm of thickness per one dielectric layer if considering the reliability.

Note that there is disclosed in the patent article 4 a dielectric material having a preferable temperature characteristic for an object of satisfying a range of the X8R characteristic of the EIA Standards. Here, a rare-earth element is added for maintaining the temperature characteristic preferable, thus, a kind of the rare-earth element is different and an ionic radius of the rare-earth element is not focused on.

The patent Article 1: The Japanese Unexamined Patent Publication No. 6-84692

The patent Article 2: The Japanese Unexamined Patent Publication No. 6-342735

The patent Article 3: The Japanese Unexamined Patent Publication No. 10-223471

The patent Article 4: The Japanese Unexamined Patent Publication No. 2000-154057

SUMMARY OF THE INVENTION

An object of the present invention is to provide a dielectric ceramic composition which has an excellent reducing resisting property, exhibits excellent temperature dependence of capacitance after firing and an improved accelerated lifetime of insulation resistance. Another object of the present invention is to provide an electronic device, such as a multilayer ceramic capacitor, having high reliability produced by using the dielectric ceramic composition, particularly to provide an electronic device, such as a midvoltage multilayer ceramic capacitor having a high rated voltage.

To attain the above objects, according to a first aspect of the present invention, there is provided a dielectric ceramic composition, comprising a main component including barium titanate, a fourth subcomponent including an oxide of R1 (note that R1 is at least one kind selected from a first element group composed of rare-earth elements having a effective ionic radius of less than 108 pm when having a coordination number of nine), and a fifth subcomponent including an oxide of R2 (note that R2 is at least one kind selected from a second element group composed of rare-earth elements having a effective ionic radius of 108 pm to 113 pm when having a coordination number of nine).

Preferably, a effective ionic radius of rare-earth elements composing the first element group is over 106 pm.

Preferably, when assuming a effective ionic radius of rare-earth elements composing the first element group is r1 and a effective ionic radius of rare-earth elements composing the second element group is r2, the first element group and the second element group are composed so that a ratio of r1 and r2 (r2/r1) satisfies a relationship of 1.007<r2/r1<1.06.

According to a second aspect of the present invention, there is provided a dielectric ceramic composition, comprising a main component including barium titanate, a fourth subcomponent including an oxide of R1 (note that R1 is at least one kind selected from a first element group composed of rare-earth elements having a effective ionic radius of less than 108 pm when having a coordination number of nine, and at least includes Y), and a fifth subcomponent including an oxide of R2 (note that R2 is at least one kind selected from a second element group composed of rare-earth elements having a effective ionic radius of 108 pm to 113 pm when having a coordination number of nine).

Preferably, when assuming a effective ionic radius of Y included in the first element group is ry and a effective ionic radius of rare-earth elements composing the second element group is r2, the second element group is composed so that a ratio of ry and r2 (r2/ry) satisfies a relationship of $1.007 < (r2/ry) < 1.05$ Preferably, when assuming a effective ionic radius of Y included in the first element group is ry and a effective ionic radius of rare-earth elements composing the second element group is r2, the second element group is composed so that a ratio of ry and r2 (r2/ry) satisfies a relationship of $1.007 < (r2/ry) < 1.03$ According to a third aspect of the present invention, there is provided a dielectric ceramic composition, comprising a main component including barium titanate, a fourth subcomponent including an oxide of R1 (note that R1 is at least one kind selected from a first element group composed of rare-earth elements having a effective ionic radius of less than 108 pm when having a coordination number of nine), and a fifth subcomponent including an oxide of R2 (note that R2 is at least one kind selected from a second element group composed of rare-earth elements having a effective ionic radius of 108 pm to 113 pm when having a coordination number of nine and at least includes Tb).

Preferably, when assuming a effective ionic radius of the rare-earth elements composing the first element group is r1 and a effective ionic radius of Tb included in the second element group is rtb, the first element group is composed so that a ratio of r1 and rtb (rtb/r1) satisfies a relationship of $1.018 < (rtb/r1) < 1.062$.

Preferably, when assuming a effective ionic radius of the rare-earth elements composing the first element group is r1 and a effective ionic radius of Tb included in the second element group is rtb, the first element group is composed so that a ratio of r1 and rtb (rtb/r1) satisfies a relationship of $1.018 < (rtb/r1) < 1.022$.

Preferably, a ratio of the fifth subcomponent to 100 mol of the main component is a ratio of Y or more.

Preferably, a ratio of a total of the fourth subcomponent and the fifth subcomponent to 100 mol of the main component is 10 mol or less (note that the number of mole of the fourth subcomponent and the fifth subcomponent is a ratio of R1 and R2 alone).

Preferably, ratios of the respective subcomponents to 100 mol of the main component are 0.1 to 10 mol in the fourth subcomponent (note that the number of mole of the fourth subcomponent is a ratio of R1 alone) and 0.1 to 10 mol in the fifth subcomponent (note that the number of mole of the fifth subcomponent is a ratio of R2 alone).

Preferably, a first subcomponent including at least one kind selected from MgO, CaO, SrO and BaO is further comprised, wherein a ratio of the first subcomponent to 100 mol of the main component is 0.1 to 5 mol.

Preferably, a second subcomponent including a $SiO_2$ based sintering aid is further comprised, wherein a ratio of the second subcomponent to 100 mol of the main component is 2 to 10 mol. In this case, the sintering aid is preferably $(Ba, Ca)_x SiO_{2+x}$ (note that x=0.8 to 1.2).

Preferably, a third subcomponent including at least one kind selected from $V_2O_5$, $MoO_3$ and $WO_3$ is further comprised, wherein a ratio of the third subcomponent to 100 mol of the main component is 0.5 mol or less.

Preferably, a sixth subcomponent including at least one of MnO and $Cr_2O_3$ is further comprised, wherein a ratio of the sixth subcomponent to 100 mol of the main component is 0.5 mol or less.

Preferably, a diffusion part at least including the R1 and R2 exists inside respective dielectric particles composing the dielectric ceramic composition.

Preferably, the dielectric particles comprise a ferroelectric part substantially not including the R1 and R2 and a diffusion part existing around the ferroelectric part, a grain boundary segregation part exists around the diffusion part, the diffusion part and grain boundary segregation part include at least the R1 and R2, and when assuming respective existential quantities of R1 and R2 in the diffusion part are MAR1 and MAR2 and respective existential quantities of R1 and R2 in the grain boundary segregation part are MBR1 and MBR2, relationships of (MBR1/MBR2)>1 and (MAR1/MAR2)<(MBR1/MBR2).

Preferably, a value of (MAR1/MAR2) in the diffusion part gradually decreases as getting close to the ferroelectric part side from the grain boundary segregation part side.

In the dielectric ceramic composition according to the above first to third aspects, the invention according to a fourth aspect described below is preferable.

According to the fourth aspect of the present invention, there is provided a dielectric ceramic composition, comprising a main component including barium titanate, a first subcomponent including MgO, a second subcomponent including a $SiO_2$ based sintering aid, a third subcomponent including $V_2O_5$, a fourth subcomponent including an oxide of R1 (note that R1 is Y), a fifth subcomponent including an oxide of R2 (note that R2 is at least one kind selected from Dy, Tb and Gd), and a sixth subcomponent including MnO, wherein ratios of the respective subcomponents to 100 mol of the main component are the first subcomponent: 0.1 to 5 mol, the second subcomponent: 2 to 10 mol the third subcomponent: 0.5 mol or less, and the sixth subcomponent: less than 0.25 mol.

In the fourth aspect, preferably, a ratio of a total of the fourth subcomponent and the fifth subcomponent with respect to 100 mol of the main component is 10 mol or less (note that the number of mole of the fourth subcomponent and the fifth subcomponent is a ratio of R1 and R2 alone).

In the fourth aspect, preferably, ratios of the respective subcomponents with respect to 100 mol of the main component are 0.1 to 10 mol in the fourth subcomponent (note that the number of mole of the fourth subcomponent is a ratio of R1 alone) and 0.1 to 10 mol in the fifth subcomponent (note that the number of mole of the fifth subcomponent is a ratio of R2 alone).

In the fourth subcomponent, preferably, a diffusion part including at least the R1 and R2 exists inside respective dielectric particles composing the dielectric ceramic composition.

In the fourth aspect, preferably, the dielectric particles comprise a ferroelectric part substantially not including the R1 and R2 and a diffusion part existing around the ferroelectric part, a grain boundary segregation part exists around the diffusion part, the diffusion part and grain boundary segregation part include at least the R1 and R2, and when assuming respective existential quantities of R1 and R2 in the diffusion part are MAR1 and MAR2 and respective existential quantities of R1 and R2 in the grain boundary segregation part are MBR1 and MBR2, relationships of (MBR1/MBR2)>1 and (MAR1/MAR2)< (MBR1/MBR2) are satisfied.

In the fourth aspect, preferably, a value of (MAR1/MAR2) in the diffusion part gradually decreases as getting close to the ferroelectric part side from the grain boundary segregation part side.

In the fourth aspect, preferably, the sintering aid is (Ba, Ca)$_x$SiO$_{2+x}$ (note that x=0.8 to 1.2).

An electronic device according to the present invention is not particularly limited as far as it is an electronic device comprising a dielectric layer, and, for example, is a multilayer ceramic capacitor element comprising a capacitor element body wherein dielectric layers and internal electrode layers are alternately stacked. In the present invention, the dielectric layer is composed of any of the above dielectric ceramic compositions. A conductive material included in the internal electrode layer is not particularly limited and, for example, is Ni or a Ni alloy.

Particularly preferable electronic device is an electronic device comprising a dielectric layer composed of a dielectric ceramic composition, wherein the dielectric ceramic composition comprises a main component including barium titanate, a first subcomponent including MgO, a second subcomponent including a SiO$_2$ based sintering aid, a third subcomponent including V$_2$O$_5$, a fourth subcomponent including an oxide of R1 (note that R1 is Y), a fifth subcomponent including an oxide of R2 (note that R2 is at least one kind selected from Dy, Tb and Gd), and a sixth subcomponent including MnO, wherein ratios of the respective subcomponents to 100 mol of the main component are the first subcomponent: 0.1 to 5 mol, the second subcomponent: 2 to 10 mol the third subcomponent: 0.5 mol or less, a total of the fourth subcomponent and the fifth subcomponent: 10 mol or less (note that the number of mole of the fourth subcomponent and the fifth subcomponent is a ratio of R1 and R2 alone), and the sixth subcomponent: less than 0.25 mol.

In this preferable electronic device, the sintering aid is preferably (Ba, Ca)$_x$SiO$_{2+x}$ (note that x=0.8 to 1.2). This preferable electronic device preferably comprises a capacitor element body wherein the dielectric layers and internal electrode layers having as a main component a conductive material composed of Ni or a Ni alloy are alternately stacked.

The electronic device of the present invention is particularly fit for a midvoltage multilayer ceramic capacitor having 100V or more for rated voltage.

Note that the ionic radius in the present specification is a value based on the article "R. D. Shannon, Acta Crystallogr., A32,751 (1976)".

Function and Effect of the Invention

The present inventors have studied on an effect of adding a rare-earth element to barium titanium and obtained knowledge that adding a plurality of rare-earth elements to barium titanium is effective to improve a high temperature load lifetime. Moreover, they obtained knowledge that a size of an ionic radius of the rare-earth element changes a distribution state of additive element to be added besides the rare-earth element, consequently, electric characteristic appearing on a multilayer ceramic capacitor becomes different. Then, as a result of a further study using the above knowledge as a premise, they confirmed that the larger the ionic radius of a rare-earth element to be added, the solid solubility with barium titanium particles becomes high, so the rare-earth element is distributed to a deep part of the barium titanium particles, and segregation of the rare-earth element, additive element, particularly alkaline earth element decreases, consequently, insulation resistance becomes high and reliability of a high temperature load lifetime, etc. is improved, while the specific permittivity declines and a temperature dependence of a capacitance becomes large so as not to satisfy the X7R characteristic. On the other hand, they confirmed that a temperature dependence of a capacitance becomes small when an ionic radius of a rare-earth element to be added is small, however, the rare-earth element and alkaline earth element are liable to be segregated together with Si, etc. to be added as a sintering aid agent and reliability as a capacitor is declined.

In this connection, the present inventors proceeded studies on adding a plurality of rare-earth elements having different ionic radiuses to barium titanium by focusing on an ionic radius of a rare-earth element and attained the present invention.

In the first aspect of the present invention, a rare-earth element group having a variety of a effective ionic radiuses is divided to two element groups at the boundary of 108 pm and added to barium titanium. In the second aspect, the rare-earth elements are divided to two element groups: an element group including Y and a rare-earth element group having a effective ionic radius of 108 pm or more, and added to barium titanium. In the third aspect, the rare-earth elements are divided to a rare-earth element group having a effective ionic radius of less than 108 pm and an element group including Tb and added to barium titanium.

In any of dielectric ceramic compositions according to the first to third aspects of the present invention, an excellent reducing resisting property is obtained at firing, and after firing, excellent properties are exhibited in a specific permittivity, dielectric loss, bias characteristic, breakdown voltage, temperature dependence of capacitance, etc., and an accelerated lifetime of insulation resistance is improved.

In an electronic device according to the present invention, since a dielectric layer composed of a dielectric ceramic composition of the present invention is provided, an accelerated lifetime of insulation resistance is improved, consequently, the reliability is improved. As an electronic device, while it is not particularly limited, a multilayer ceramic capacitor, piezoelectric element, chip inductor, chip varistor, chip thermistor, chip resistance and other surface-mounted (SMD) chip type electronic devices may be mentioned. Particularly, according to the fourth aspect, an electronic device suitable to midvoltage multilayer ceramic capacitors having a high rated voltage (for example 100V or more) can be provided.

Note that in the patent article 3 referred to in the Description of the Related Art above, a dielectric ceramic composition wherein a plurality of rare-earth elements selected from freely divided two groups of element groups are added to barium titanate is disclosed. However, in the publication, there is not disclosed any invention thoughts of dividing rare-earth elements to two groups based on sizes of effective ionic radiuses when having a coordination number of nine as in the present invention. Accordingly, in the publication, Y and Sc belong to one element group. The same explanation can be adopted to the patent article 4 referred to in the Description of the Related Art, as well.

Meanwhile, in the present invention, Sc is omitted. It is because Sc has a largely different ionic radius comparing with those of other rare-earth elements, so a effective ionic radius when having a coordination number of nine is not regulated. Thus, Y and Sc do not belong to one element group in the present invention.

When assuming that Sc is used as an element having a effective ionic radius of less than 108 pm, it is confirmed that the X7R characteristic can be satisfied, but an accelerated lifetime of insulation resistance has not to be improved (refer to Sample 24 in Table 3). The reason why is considered that because the ionic radius of Sc is fairly small comparing with those of other rare-earth elements, such as Y, the solid solubility with barium titanium particle is largely different from those in other rare-earth elements and an effect of suppressing segregation of alkaline-earth element cannot be obtained.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Figure 1:
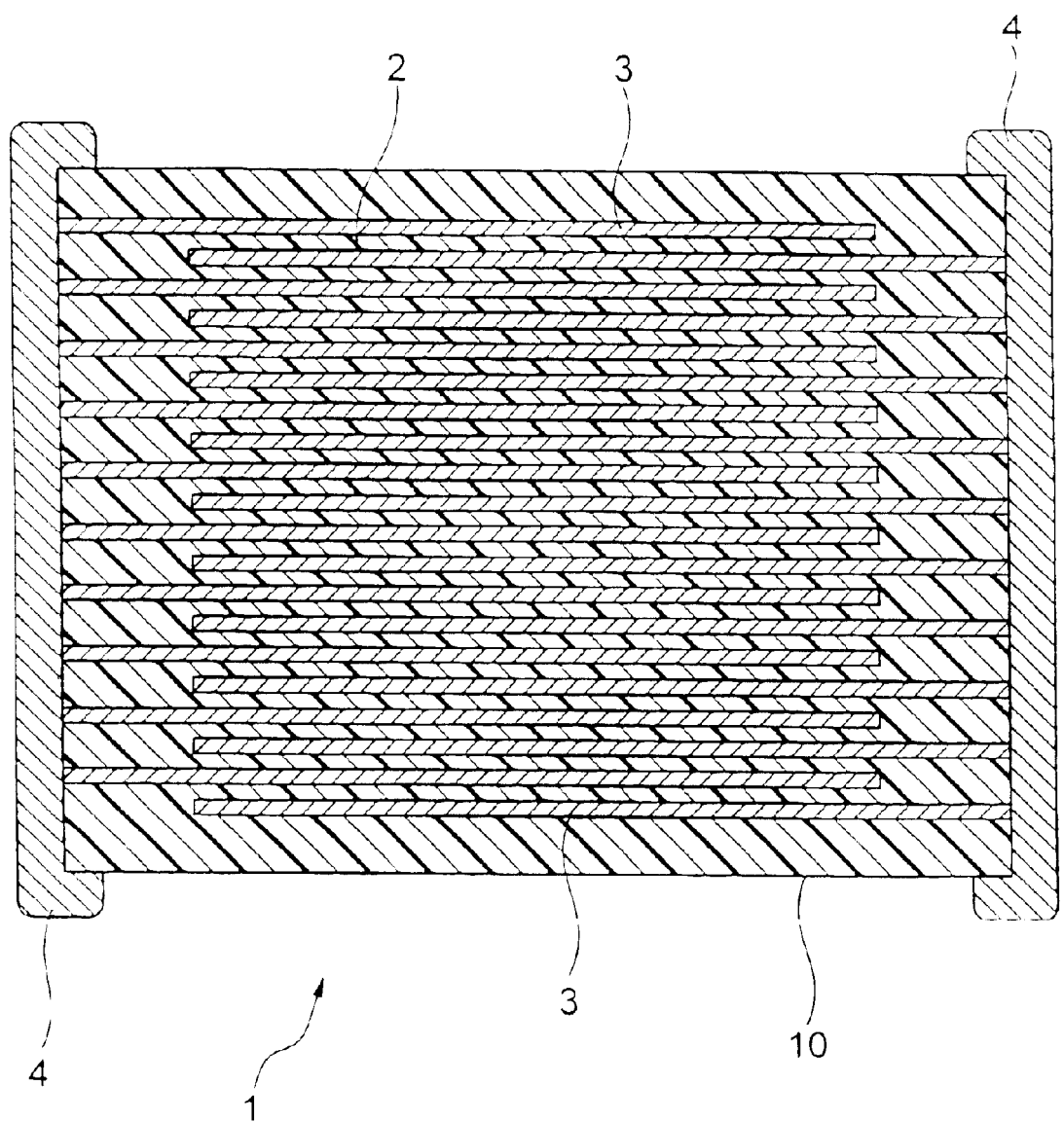
FIG. 1 is a cross-sectional view of a multilayer ceramic capacitor according to an embodiment of the present invention.

As shown in FIG. 1, a multilayer ceramic capacitor 1 according to an embodiment of the present invention comprises a capacitor element body 10 having the configuration wherein dielectric layers 2 and internal electrode layers 3 are alternately stacked. At both ends of the capacitor element body 10 are formed a pair of external electrodes 4 respectively connected to the internal electrode layers 3 alternately arranged inside the element body 10. A shape of the capacitor element body 10 is not particularly limited, but is normally made in a parallelepiped shape. Further, the capacitor dimensions are not limited and may be made with suitable dimensions for the application. Usually, however, the dimensions are (0.6 to 5.6 mm)×(0.3 to 5.0 mm)×(0.3 to 1.9 mm) or so.

The internal electrode layers 3 are stacked so that the end faces thereof alternately protrude out to the surfaces of the two opposing ends of the capacitor element body 10. The pair of external electrodes 4 are formed at the two ends of the capacitor element body 10 and are connected to the exposed end faces of the alternately arranged internal electrode layers 3 so as to compose the capacitor circuit.

The dielectric layer 2 contains a dielectric ceramic composition of the present invention.

A dielectric ceramic composition according to the first aspect comprises a main component including barium titanate (preferably, expressed by a composition formula $Ba_mTiO_{2+m}$, wherein $0.995 \leq m \leq 1.010$ and a ratio of Ba and Ti is $0.995 \leq Ba/Ti \leq 1.010$), a fourth subcomponent including an oxide of R1 (note that R1 is at least one element selected from a first element group composed of rare-earth elements having a effective ionic radius of less than 108 pm when having a coordination number of nine), and a fifth subcomponent including an oxide of R2 (note that R2 is at least one kind selected from a second element group composed of rare-earth elements having a effective ionic radius of 108 pm to 113 pm when having a coordination number of nine).

In the first aspect of the present invention, the first element group includes Y (107.5 pm), Ho (107.2 pm), Er (106.2 pm), Tm (105.2 pm), Yb (104.2 pm) and Lu (103.2 pm) and the second element group includes Dy (108.3 pm), Tb (109.5 pm), Gd (110.7 pm) and Eu (112 pm). In the present invention, Sm (113.2 pm), Pm (114.4 pm), Nd (116.3 pm), Pr (117.9 pm), Ce (119.6 pm) and La (121.6 pm) are omitted. It is because Sm, Pm, Nd, Pr, Ce and La are rare-earth elements having a effective ionic radius over 113 pm when having a coordination number of nine. The numbers in brackets indicate a effective ionic radius when having a coordination number of nine. It will be the same in the following description. Note that Sc is omitted in the present invention, because a effective ionic radius thereof is not regulated when having a coordination number of nine.

In the first aspect, a effective ionic radius of rare-earth elements composing the first element group preferably exceeds 106 pm. The first element group as such includes Y, Ho and Er. When using a rare-earth element having a small a effective ionic radius in the first element group, a heterogenous phase (segregation) occurs in some cases. When a heterogenous phase occurs, the solid solubility with the barium titanate particle declines, and eventually, reliability as a capacitor is liable to decline.

Thus, it is preferable to use those having a large a effective ionic radius among the rare-earth elements composing the first element group, particularly, rare-earth elements having a effective ionic radius of over 107 pm composing the first element group are preferably used. The first element group as such includes Y and Ho. Still more preferably, Y is used.

In the first aspect, when assuming that a effective ionic radius of rare-earth elements composing the first element group is r1 and a effective ionic radius of rare-earth elements composing the second element group is r2, it is preferable that the first element group and the second element group are composed so that the ratio of r1 and r2 (r2/r1) satisfies a relationship of 1.007<r2/r1<1.06.

A dielectric ceramic composition according to the second aspect of the present invention comprises a main component including barium titanate (preferably expressed by a composition formula $Ba_m Ti_{2+m}$, wherein m is $0.995 \leq m \leq 1.010$ and a ratio of Ba and Ti is $0.995 \leq Ba/Ti \leq 1.010$), a fourth subcomponent including an oxide of R1 (note that R1 is one kind selected from a first element group composed of rare-earth elements having a effective ionic radius of less than 108 pm when having a coordination number of nine and at least Y is included), and a fifth subcomponent including an oxide of R2 (note that R2 is at least one kind selected from a second element group composed of rare-earth elements having a effective ionic radius of 108 pm to 113 pm when having a coordination number of nine).

In the second aspect, the first element group is preferably composed only of Y. Also, in the second aspect, the second element group includes Dy, Tb, Gd and Eu. More preferably, Tb is used. Namely, the most preferable combination is Y and Tb.

In the second aspect, when assuming a effective ionic radius of Y included in the first element group is ry and that of the rare-earth elements composing the second element group is r2, it is preferable that the second element group is composed so that the ratio of ry and r2 (r2/ry) satisfies a relationship of 1.007<(r2/ry)<1.05. The second element group as such includes Dy, Tb, Gd and Eu.

In the second aspect, when assuming a effective ionic radius of Y included in the first element group is ry and that of the rare-earth elements composing the second element group is r2, it is preferable that the second element group is composed so that the ratio of ry and r2 (r2/ry) satisfies a relationship of 1.007<(r2/ry)<1.03. The second element group as such includes Dy, Tb and Gd.

A dielectric ceramic composition according to the third aspect of the present invention comprises a main component including barium titanium (preferably expressed by a composition formula $Ba_m TiO_{2+m}$, wherein m is $0.995 \leq m \leq 1.010$ and a ratio of Ba and Ti is $0.995 \leq Ba/Ti \leq 1.010$), a fourth subcomponent including an oxide of R1 (note that R1 is at least one kind selected from a first element group composed of rare-earth elements having a effective ionic radius of less than 108 pm when having a coordination number of nine), and a fifth subcomponent including an oxide of R2 (note that R2 is at least one kind selected from a second element group composed of rare-earth elements having a effective ionic radius of 108 pm to 113 pm when having a coordination number of nine but at least Tb is included).

In the third aspect, the first element group includes Y, Ho, Er, Tm, Yb and Lu. Also, in the third aspect, the second element group is preferably composed only of Tb.

In the third aspect, when assuming that a effective ionic radius of rare-earth elements composing the first element group is r1 and that of Tb included in the second element group is rtb, it is preferable that the first element group is composed so that the ratio of r1 and rtb (rtb/r1) satisfies a relationship of 1.018<rtb/r1<1.062. The first element group as such includes Y, Ho, Er, Tm, Yb and Lu.

In the third aspect, when assuming that a effective ionic radius of rare-earth elements composing the first element group is r1 and that of Tb included in the second element group is rtb, it is preferable that the first element group is composed so that the ratio of r1 and rtb (rtb/r1) satisfies a relationship of 1.018<rtb/r1<1.022. The first element group as such includes Y and Ho.

In a dielectric ceramic composition of the present invention, it is preferable that the ratio of the fifth subcomponent to 100 mol of the main component is not less than the ratio of Y. Note that when the ratio of the fifth subcomponent is too great, the temperature characteristic of a capacitance is liable to be deteriorated. Thus, the ratio of the fifth subcomponent and Y is preferably the fifth subcomponent: Y=50 to 90%: 10 to 50%, more preferably, fifth subcomponent: Y=50 to 70%: 30 to 50%.

In the dielectric ceramic composition of the present invention, ratios of respective subcomponents to 100 mol of the main component are preferably 0.1 to 10 mol of the fourth subcomponent and 0.1 to 10 mol of the fifth subcomponents, more preferably, 0.2 to 5 mol of the fourth subcomponent and 0.2 to 5 mol of the fifth subcomponent.

The ratio of the fourth subcomponent is not the number of mole of an R1 oxide, but a mole ratio of the R1 alone. Namely, for example, when using a Y oxide as the fourth subcomponent, the ratio of the fourth subcomponent being 1 mol does not mean the ratio of $Y_2O_3$ being 1 mol, but the ratio of Y being 1 mol. The ratio of the fifth subcomponent is not the number of mole of an R2 oxide but a mole ratio of the R2 alone. Namely, when using an oxide of Tb as the fifth subcomponent, the ratio of the fifth subcomponent being 1 mol does not mean the ratio of $Tb_4O_7$ being 1 mol but the ratio of Tb being 1 mol.

In a dielectric ceramic composition of the present invention, the fourth subcomponent (an oxide of R1) gives an effect of making the temperature dependence of capacitance smooth. When a content of the fourth subcomponent is too small, the effect becomes insufficient and the temperature dependence of capacitance deteriorates. On the other hand, when the content is too large, sintering property is liable to decline. Among the fourth subcomponents, since an improving effect of the characteristic is strong and the price can be suppressed low, a Y oxide and a Ho oxide are preferable and a Y oxide is more preferable.

In the dielectric ceramic composition of the present invention, the fifth subcomponent (an oxide of R2) gives an effect of improving insulation resistance (IR), IR lifetime and DC bias. Note that when a content of an R2 oxide is too great, the temperature dependence of capacitance is liable to deteriorate. Among the fifth subcomponents, because of a strong improving effect of the characteristics, a Dy oxide, a Tb oxide and a Gb oxide are preferable and a Tb oxide is more preferable.

In the dielectric ceramic composition of the present invention, the ratio of a total of the fourth subcomponent and the fifth subcomponent to 100 mol of the main component is preferably 10 mol or less, more preferably 5 mol or less. Note that the numbers of mol of the fourth subcomponent and the fifth subcomponent are the ratios of R1 and R2 alone. It is to maintain the sintering property preferable.

Preferably, the dielectric ceramic composition of the present invention is further added a first subcomponent including at least one kind selected from MgO, CaO, SrO and BaO, if necessary. The ratio of the first subcomponent to 100 mol of the main component is preferably 0.1 to 5 mol. When a content of the first subcomponent is too small, the capacitance temperature dependence rate becomes large. While, when the content is too large, the sintering property deteriorates. Note that the composition ratios of the respective oxides in the first subcomponent may be any.

Preferably, the dielectric ceramic composition of the present invention is further added a second subcomponent including a $SiO_2$ based sintering aid. In this case, more preferably, the sintering aid is $(Ba, Ca)_x SiO_{2+x}$ (note that x=0.8 to 1.2).

The ratio of the second subcomponent to 100 mol of the main component is preferably 2 to 10 mol, more preferably, 2 to 5 mol. When $(Ba, Ca)_xSiO_{2+x}$ is included in the second subcomponent, although BaO and CaO in the second subcomponent are also included in the first subcomponent, since the $(Ba, Ca)_xSiO_{2+x}$ as a complex oxide has a low melting point and has a preferable reactivity to the main component, BaO and/or CaO are preferably added as the complex oxide in the present embodiment. When a content of the second subcomponent is too small, the temperature dependence of capacitance deteriorates and IR (insulation resistance) declines. While when the content is too great, an IR lifetime becomes insufficient and an abrupt decline of the dielectric constant occurs. The "x" in $(Ba, Ca)_xSiO_{2+x}$ is preferably 0.8 to 1.2, more preferably 0.9 to 1.1.when the "x" is too small, that is when $SiO_2$ is too large, it reacts with barium titanate included in the main component so as to deteriorate the dielectric characteristic. On the other hand, when the "x" is too large, the melting point becomes high and the sintering property deteriorates, which is not preferable. Note that the ratios of Ba and Ca in the second subcomponent may be any and only one of the two may be included.

Preferably, the dielectric ceramic composition of the present invention is further added a third subcomponent including at least one kind selected from $V_2O_5$, $MoO_3$ and $WO_3$. The ratio of the third subcomponent to 100 mol of the main component is preferably 0.5 mol or less, more preferably 0.01 to 0.1 mol. The third subcomponent gives an effect to smooth the temperature dependence of capacitance and to improve an IR lifetime at the Curie temperature or more. When a content of the third subcomponent is too small, the effects become insufficient. While when the content is too great, IR remarkably declines. Note that the composition ratios of the respective oxides in the third subcomponent may be any.

Preferably, the dielectric ceramic composition of the present invention is further added a sixth subcomponent including at least one kind of MnO and $Cr_2O_3$. The sixth subcomponent gives an effect of promoting sintering, an effect of improving IR and an effect of improving an IR lifetime. To obtain sufficient effects, a ratio of the sixth subcomponent to 100 mol of the main component is preferably 0.01 mol or more. Note that when a content of the sixth subcomponent is too large, an adverse effect is given to the temperature dependence of capacitance, so the content is preferably not more than 0.5 mol. To improve a CR product, less than 0.25 mol is preferable.

Preferably, the dielectric ceramic composition of the present invention may include $Al_2O_3$ other than the above oxides. $Al_2O_3$ does not affect the temperature dependence of capacitance but gives effects of improving sintering property, IR and IR lifetime. Note that when a content of $Al_2O_3$ is too large, the sintering property declines and the IR becomes low, so the ratio of $Al_2O_3$ to 100 mol of the main component is preferably 1 mol or less, more preferably not more than 1 mol in the overall dielectric ceramic composition.

Note that in the present specification, respective oxides composing a main component and subcomponents are expressed by a stoichiometric composition, but an oxidized state of the respective oxides may be deviated from the stoichiometric composition. Note that the ratios of the subcomponents are obtained by converting to oxides of the above stoichiometric compositions from an amount of metals included in oxides composing the subcomponents.

Note that when at least one kind of Sr, Zr and Sn replaces Ba or Ti in the main component composing the perovskite structure, the Curie temperature shifts to the low temperature side, so the temperature dependence of capacitance at 125° C. or more becomes deteriorated. Therefore, $BaTiO_3$ [for example, $(Ba, Sr)TiO_3$] including these elements is preferably not used as the main component. Note that when it is used by a level of an impurity to be included (not more than 0.1 mol or so of the overall dielectric ceramic composition), it is not a problem.

A thickness of the dielectric layer 2 is normally 40 μm or less, particularly 30 μm or less per one layer. The least limit of the thickness is normally 0.5 μm or so. Note that the number of layers to be stacked in the dielectric layer 2 is normally 2 to 1000 or so.

Figure 7A:
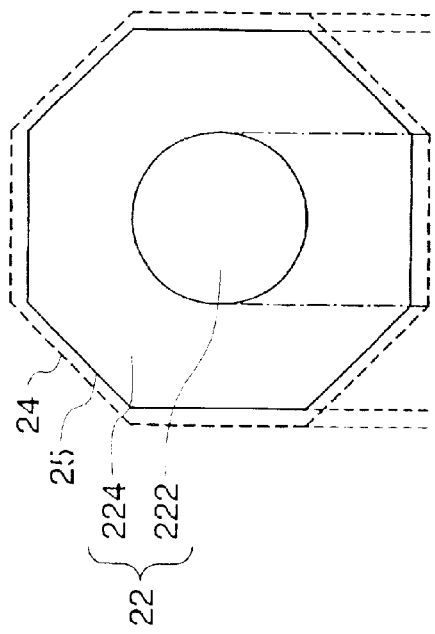
FIG. 7A is a schematic view of the fine structure of a dielectric particle contained in the dielectric ceramic composition in FIG. 6.

The dielectric layer 2 is, for example as shown in FIG. 7A, composed of dielectric particle 22 and a grain boundary segregation part 24 existing around the dielectric particle 22. Note that the reference number 25 in the figure indicates a grain boundary. The dielectric particle 22 comprises a ferroelectric part 222 and a diffusion part 224 existing around the ferroelectric part 222. Preferably, the ferroelectric part 222 does not substantially include the R1 and R2. The words "substantially not including the R1 and R2" also include those including R1 and R2 to an extent the effects of the present invention can be obtained other than those completely composed of the ferroelectric part.

In the diffusion part 224 and the grain boundary segregation part 24, preferably, at least the R1 and R2 are dispersed.

More preferably, R1 is dissolved more than R2 in the grain boundary segregation part 24. Namely, when assuming that respective existential quantities of R1 and R2 in the grain boundary segregation part 24 are MBR1 and MBR2, it is preferable that a relationship of (MBR1/MBR2)>1 is satisfied.

More preferably, R2 is dispersed more as getting close to the center of the particle 22 (from the grain boundary segregation part 24 side to the ferroelectric part 222 side) in the diffusion part 224. Namely, when assuming the respective existential quantities of R1 and R2 in the diffusion part 224 are MAR1 and MAR2, preferably, a value of (MAR1/MAR2) gradually decreases as getting close to the ferroelectric part 222 side from the grain boundary segregation part 24 side.

More preferably, a value of the ratio of the existential quantities of the R1 and R2 (MAR1/MAR2) in the diffusion part 224 is smaller than a value of the ratio of the existential quantities of the R1 and R2 (MBR1/MBR2) in the grain boundary segregation part 24. Namely, it is preferable that a relationship of (MAR1/MAR2)<(MBR1/MBR2) is satisfied.

By including the dielectric particle 22 configured as above, capacitance temperature dependency by the dielectric ceramic composition in a temperature range of −55° C. to 125° C. becomes small and an accelerated lifetime of insulation resistance (high temperature load lifetime) is improved.

An average crystal grain diameter of the dielectric particle 22 is not particularly limited and may be suitably determined from a range of, for example, 0.1 to 5 μm in accordance with a thickness of the dielectric layer 2. The temperature dependence of capacitance tends to decline more, as the dielectric layer 2 per layer gets thinner and as the average crystal grain diameter gets smaller. Therefore, the dielectric ceramic composition of the present invention is particularly effective when the average crystal grain diameter has to be small, specifically, 0.1 to 0.5 μm. Also, when the average crystal grain diameter is made small, the IR lifetime becomes long and a change of a capacitance over time under a direct-current electric field becomes small, so the average crystal grain diameter is preferably small as above from this point of view.

In a dielectric ceramic composition according to the above first to third aspects, an embodiment of an invention according to the fourth aspect described below is preferable.

A dielectric ceramic composition according to the fourth aspect of the present invention comprises a main component including barium titanate;
a first subcomponent including MgO;
a second subcomponent including a $SiO_2$ based sintering aid;
a third subcomponent including $V_2O_5$;
a fourth subcomponent including an oxide of R1 (note that R1 is Y);
a fifth subcomponent including an oxide of R2 (note that R2 is at least one kind selected from Dy, Tb and Gd); and
a sixth subcomponent including MnO;
wherein ratios of the respective subcomponents to 100 mol of the main component are
the first subcomponent: 0.1 to 5 mol,
the second subcomponent: 2 to 10 mol
the third subcomponent: 0.5 mol or less,
the sixth subcomponent: less than 0.25 mol.

In the fourth aspect, a ratio of a total of the fourth subcomponent and the fifth subcomponent to 100 mol of the main component is preferably 10 mol or less (note that the numbers of mol of the fourth subcomponent and the fifth subcomponent are ratios of R1 and R2 alone).

In the fourth aspect, ratios of the respective subcomponents to 100 mol of the main component are preferably 0.1 to 10 mol of the fourth subcomponent (note that the number of mole of the fourth subcomponent is a ratio of R1 alone) and 0.1 to 10 mol of the fifth subcomponent (note that the number of mole of the fifth subcomponent is a ratio of R2 alone).

In the fourth subcomponent, it is preferable that a diffusion part 224 including at least the R1 and R2 above exists inside every dielectric particle 22 composing the dielectric ceramic composition.

In the fourth aspect, preferably, the dielectric particle 22 comprises a ferroelectric part 222 substantially not including the R1 and R2 and a diffusion part 224 existing around the ferroelectric part 222;

a grain boundary segregation part 24 exists around the diffusion part 224;

the diffusion part 224 and grain boundary segregation part 24 include at least the R1 and R2; and when assuming respective existential quantities of R1 and R2 in the diffusion part 224 are MAR1 and MAR2 and respective existential quantities of R1 and R2 in the grain boundary segregation part 24 are MBR1 and MBR2, relationships of (MBR1/MBR2)>1 and (MAR1/MAR2)<(MBR1/MBR2) are satisfied.

In the fourth aspect, a value of (MAR1/MAR2) in the diffusion part 224 gradually decreases as getting close to the ferroelectric part 222 side from the grain boundary segregation part 24 side.

In the fourth aspect, the sintering aid is $(Ba, Ca)_x SiO_{2+x}$ (note that x=0.8 to 1.2).

A conductive material included in the internal electrode layer 3 is not particularly limited but base metals can be used because components of the dielectric layer 2 have reducing resisting property. As the base metal to be used as a conductive material, Ni or a Ni alloy is preferable. As the Ni alloy, an alloy of Ni and at least one kind of elements selected from Mn, Cr, Co and Al is preferable and a content of Ni in the alloy is preferably 95 wt % or more. Note that not more than 0.1 wt % or so of P and other various trace constituents may be included in the Ni or the Ni alloy. A thickness of the internal electrode layer 3 may be suitably determined in accordance with use, etc. and is normally 0.5 to 5 μm, particularly 0.5 to 2.5 μm.

A conductive material included in the external electrode 4 is not particularly limited but inexpensive Ni, Cu and alloys of these can be used in the present invention. A thickness of the external electrode 4 may be suitably determined in accordance with use, etc. and normally 10 to 50 μm or so is preferable.

A multilayer ceramic capacitor using a dielectric ceramic composition of the present invention is produced by preparing a green chip by a normal printing method or a sheet method using a paste, firing the same, printing or transferring an external electrode and firing in the same way as multilayer ceramic capacitors of the related art. Below, a specific explanation will be made on a production method.

First, dielectric ceramic composition powder included in a dielectric layer paste is prepared and made to be a paint so as to adjust the dielectric layer paste.

The dielectric layer paste may be an organic-based paint comprised of a mixture of a dielectric ceramic composition powder and an organic vehicle and may also be a water-based paint.

For the dielectric ceramic composition powder, use may be made of the above oxides or mixtures thereof or composite oxides, but it is also possible to use one suitably selected from various compounds or mixtures becoming the above oxides or composite oxides after firing, such as carbonates, oxalates, nitrates, hydroxides and organic metal compounds. The content of the compounds in the dielectric ceramic composition powder may be suitably determined so as to give the above composition of the dielectric ceramic composition after firing.

An average particle size of the dielectric ceramic composition powder is normally 0.1 to 3 μm or so in a state before being made to be a paint.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene and other organic solvents in accordance with the printing method, sheet method, or other methods of use.

Further, when using a water-based paint as the dielectric layer paste, it is sufficient to knead a water-based vehicle comprised of a water-based binder or dispersant, etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode layer paste is prepared by kneading the electroconductive material comprised of the above various types of electroconductive metals and alloys or various types of oxides becoming the above electroconductive materials after firing, an organic metal compound, resinate, etc. together with the above organic vehicle.

The external electrode paste may be prepared in the same way as in the above internal electrode layer paste.

The content of the organic vehicle in the above pastes is not particularly limited and may fall within the usual amount, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total amount of these is preferably not more than 10 wt %.

When using a printing method, the dielectric layer paste and the internal electrode layer paste are successively printed on the PET or other substrate. The result is then cut into a predetermined shape, afterwhich the pastes are peeled off from the substrate to form a green chip.

Further, when using a sheet method, a dielectric layer paste is used to form a green sheet, the internal electrode layer paste is printed on upper surface of this, afterwhich these are layered to form a green chip.

Before firing, the green chip is processed to remove the binder. This process for removing the binder may be suitably determined in accordance with a kind of an electroconductive material in the internal electrode layer paste, but when using Ni or a Ni alloy or other base metals as the electroconductive material, it is preferable that the partial pressure of oxygen in the binder removal atmosphere is $10^{-45}$ to $10^5$ Pa. When the oxygen partial pressure is less than the range, the binder removal effect declines, while when exceeds the range, the internal electrode layers tent to become oxidized.

Further, other conditions of removing a binder are a rate of temperature rise of 5 to 300° C./hour, in particular 10 to 100° C./hour, a holding temperature is 180 to 400° C., in particular 200 to 350° C. and a temperature holding time is 0.5 to 24 hours, in particular 2 to 20 hours. Also, a firing atmosphere is preferably the air or a reducing atmosphere, and it is preferable to use a wet mixture gas of for example $N_2$ and $H_2$ as an atmosphere gas in the reducing atmosphere.

The atmosphere when firing the green chip may be suitably determined in accordance with the type of electroconductive material in the internal electrode layer paste, but when using Ni or a Ni alloy or other base metal as the electroconductive material, the oxygen partial pressure in the firing atmosphere is preferably $10^{-8}$ to $10^{-4}$ Pa. If the oxygen partial pressure is less than this range, the electroconductive material of the internal electrode layers becomes abnormally sintered and ends up breaking in the middle in some cases. Further, if the oxygen partial pressure exceeds the above range, the internal electrode layers tend to become oxidized.

Further, the holding temperature at the time of firing is preferably 1100 to 1400° C., more preferably 1200 to 1350° C. If the holding temperature is less than the above range, the densification becomes insufficient, while if over that range, there is a tendency toward breaking of the electrodes due to abnormal sintering of the internal electrode layers, deterioration of the temperature dependence of capacitance due to dispersion of the material comprising the internal electrode layers, and reduction of the dielectric ceramic composition.

The various conditions other than the above conditions are that preferably the rate of temperature rise is 50 to 500° C./hour, in particular 200 to 300° C./hour, a temperature holding time is 0.5 to 8 hours, in particular 1 to 3 hours, the cooling rate is 50 to 500°/hour, in particular 200 to 300° C./hour. Note that the firing atmosphere is preferably a reducing atmosphere. As the atmosphere gas, it is preferable to use, for example, a wet mixed gas of $N_2$ and $H_2$.

When firing in a reducing atmosphere, the capacitor element body is preferably annealed. The annealing process is for re-oxidizing the dielectric layer. Since this enables the IR lifetime to be remarkably prolonged, reliability is improved.

The oxygen partial pressure in the annealing atmosphere is preferably not less than $10^{-3}$ Pa, in particular $10^{-2}$ to 10 Pa. If the oxygen partial pressure is less than the above range, re-oxidation of the dielectric layers is difficult, while if over that range, the internal electrode layers tend to become oxidized.

The holding temperature at the time of annealing is preferably not more than 1100° C., in particular 500 to 1100° C. If the holding temperature is less than the above range, oxidation of the dielectric layers becomes insufficient, so the IR tends to become low and the IR lifetime short. On the other hand, when the holding temperature exceeds the above range, not only do the internal electrode layers oxidize and the capacitance fall, but also the internal electrode layers end up reacting with the dielectric material resulting in a tendency toward deterioration of the temperature dependence of capacitance, a fall in the IR and a fall in the IR lifetime. Note that the annealing may be comprised of only a temperature raising process and temperature reducing process. That is, the temperature holding time may also be zero. In this case, the holding temperature is synonymous with the maximum temperature.

The various conditions other than the above conditions in annealing are that the temperature holding time is preferably 0 to 20 hours, in particular 2 to 10 hours, the cooling rate is preferably 50 to 500° C./hour, in particular 100 to 300° C./hour. Note that for the atmospheric gas, preferably, a wet $N_2$ gas, etc. is used.

During the process for removing the binder, the firing, and the annealing, for example, a wetter, etc. may be used to wet the $N_2$ gas or mixed gas. In this case, the temperature of the water is preferably 5 to 75° C.

The process for removing the binder, firing, and annealing may be performed consecutively or independently.

The thus obtained capacitor element body is, for example, end polished using barrel polishing or sandblasting etc., then printed or transferred with an external electrode paste and fired to form the external electrodes 4. The firing conditions of the external electrode paste are, for example, preferably 600 to 800° C. for 10 minutes to 1 hour or so in a wet mixed gas of $N_2$ and $H_2$. Further, in accordance with need, the surfaces of the external electrodes 4 may be formed with a covering layer using plating techniques, etc.

The thus produced multilayer ceramic capacitor of the present invention is mounted by soldering it onto a printed circuit board, etc. for use in various types of electronic equipment.

Note that an embodiment of the present invention was explained above, however, the present invention is not limited to the above embodiments and may be modified in various ways within the scope of the invention.

For example, in the above embodiments, illustration was made of a multilayer ceramic capacitor as the electronic device according to the present invention, but the electronic device according to the present invention is not limited to a multilayer ceramic capacitor and may be any device having a dielectric layer comprised of a dielectric ceramic composition of the above composition.

EXAMPLE

Below, the present invention will be explained based on further detailed examples, but the present invention is not limited by the examples.

Example 1

A main component material and subcomponent materials respectively having an average particle diameter of 0.1 to 1 $\mu$m were prepared. Carbonate was used for a material of MgO and MnO, and oxides were used for other materials. Note that 3 mol of $(Ba_{0.6}Ca_{0.4})SiO_3$ was used as a material of a second subcomponent to 100 mol of the main component material. 3 mol of $(Ba_{0.6} Ca_{0.4})SiO_3$ was prepared by performing wet mixing using a ball mill for 16 hours on 1.8 mol of $BaCO_3$, 1.2 mol of $CaCO_3$ and 3 mol of $SiO_2$, drying, firing at 1150° C. in the air, and further performing wet grinding using a ball mill for 100 hours. These materials were compounded so that the composition after firing becomes as shown in Table 1, subjected to wet mixing by using a ball mill for 16 hours and dried to be a dielectric material.

Namely, in samples of the present example (samples 8, 9, 16 and 17), R1 (the fourth subcomponent) and R2 (the fifth subcomponent) are included, while in samples of a comparative example (samples 1 to 5, 10, 11 and 18), only one of the R1 (fourth subcomponent) or R2 (the fifth subcomponent) is included.

Note that Sc is further included in the sample 1. Also, Sm is included in the sample 18. In samples of the present example, R1 (the fourth subcomponent) is fixed to Y and a kind of R2 (the fifth subcomponent) is changed.

A dielectric layer paste was obtained by mixing by using a ball mill to make a paste 100 parts by weight of the thus obtained dielectric material, 4.8 parts by weight of an acrylic resin, 40 parts by weight of methylene chloride, 20 parts by weight of ethyl acetate, 6 parts by weight of mineral spirits and 4 parts by weight of acetone.

An internal electrode paste was made by kneading using a triple-roll to make a paste 100 parts by weight of Ni particles of an average particle size of 0.2 to 0.8 µm, 40 parts by weight of an organic vehicle (8 parts by weight of an ethyl cellulose resin dissolved in 92 parts by weight of butyl carbitol), and 10 parts by weight of butyl carbitol.

The above dielectric layer paste was used to form a green sheet on a PET film. The internal electrode paste was printed on this, then the sheet was peeled from the PET film. Next, the thus obtained green sheets and protection green sheet (on which the internal electrode layer paste is not printed) were layered, adhered by means of pressure to prepare a green chip.

Then, the green chip was cut to a predetermined size and was processed to remove the binder, fired, and annealed under conditions below to obtain a multilayer ceramic fired body. The process of removing the binder was performed under conditions of a temperature rising rate of 30° C./hour, a holding temperature of 260° C., a temperature holding time of 8 hours, and in the air atmosphere. Firing conditions were a temperature rising rate of 200° C./hour, a holding temperature of 1280° C., a temperature holding time of 2 hours, a cooling rate of 200° C./hour, and in an atmosphere of a wet mixed gas of $N_2+H_2$ (oxygen partial pressure was $10^{-6}$ Pa). The annealing conditions were a holding temperature of 900° C., a temperature holding time of 9 hours, a cooling rate of 300° C./hour, and in an atmosphere of a wet $N_2$ gas (oxygen partial pressure was $10^{-2}$ Pa). Note that a wetter having a water temperature of 35° C. was used for wetting the atmosphere gases at the time of the firing and annealing.

Next, the end faces of the fired multilayer ceramic firing body was polished by sandblasting, then, In—Ga is applied as an external electrode so as to obtain samples of a multilayer ceramic capacitor shown in FIG. 1.

The size of the thus obtained capacitor samples was 3.2 mm×1.6 mm×0.6 mm, the number of dielectric layers sandwiched by the internal electrode layers was 4 and the thickness per one layer (an interlayer thickness) was about 11.5 µm or 9.5 µm, and a thickness of the internal electrode layer was 1.5 µm. The characteristics below of the respective samples were evaluated.

Specific Permittivity (ε), Dielectric Loss (tan δ), Insulation Resistance (IR) and CR Product The capacitance was measured by a digital LCR meter (4274A made by YHP Company) under conditions of a frequency of 1 kHz and an input signal level (a measurement voltage) of 1 Vrms. Then, the specific permittivity (no unit) was calculated from the obtained capacitance. Next, a direct-current of 100V was applied for 60 seconds at 25° C. to the capacitor samples to measure the insulation resistance IR by using an insulator resistance meter (R8340A made by Advantest Co.

The CR product was expressed by a product of a capacitance (C, µF) and insulation resistance (IR, MΩ). The dielectric loss (tan δ) was measured by a digital LCR meter (4274A made by YHP Company) at 25° C. under conditions of a frequency of 1 kHz and an input signal level (measurement voltage) at 1 Vrms.

The specific permittivity ε is a significant characteristic for producing a compact capacitor having a high dielectric constant. In the present example, a value of the specific permittivity ε was an average of values measured by using the number of capacitance samples n=10 and it was considered preferable when the value is 1800 or more.

In the present example, a value of the dielectric loss tan δ was an average of values measured by using the number of capacitance samples n=10 and less than 1.1% was considered preferable, more preferably less than 1.0%. The results are shown in Table 1.

Temperature Characteristic 1 of Capacitance

The capacitance was measured on the capacitor samples by a digital LCR meter (4274A made by YHP Company) under conditions of a frequency of 1 kHz and an input signal level (a measurement voltage) of 1 Vrms. Whether a capacitance change rate (ΔC/C) with respect to the temperature satisfies the X7R characteristic of the EIA Standards was investigated. The results are shown in Table 1, wherein those satisfying are checked "o" and those not satisfying are checked "x".

DC Bias Characteristic (Direct-Current Voltage Application Dependency of Dielectric Constant)

A change of the dielectric constant (unit of %) at the time of gradually applying a direct-current voltage to the capacitor samples at a constant temperature (25° C.) was calculated (a measurement condition was 4V/µm). In the present example, the DC bias characteristic was an average of values measured and calculated by using 10 capacitor samples and those within ±30% were considered preferable. The results are shown in Table 1. It was confirmed that in the sample 9, which was a typical sample of the present example, the dielectric constant was hard to decrease and a stable DC bias characteristic was obtained even when a high voltage was applied.

High Temperature Load Lifetime (Accelerated Lifetime of Insulation Resistance)

The high temperature load lifetime was measured on the capacitor samples by keeping them in a state of being applied direct-current voltages of 10V/µm, 17.4 V/µm and 21 V/µm at 200° C. The high temperature load lifetime is significant particularly when dielectric layers are made thinner. In the present example, a time from the start of application until resistance decreased by one digit was defined as a lifetime. The above measurement was performed on 10 capacitor samples and an average lifetime thereof was calculated.

Breakdown Voltage

A leakage current of 100 mA was detected or a voltage at the time of breaking an element (a breakdown voltage, unit of V/µm) was measured on the capacitor samples by applying a direct-current voltage at a temperature rising rate of 100V/sec. In the present example, the breakdown voltage was an average of values measured by using 10 capacitor samples and 80V/µm or more was considered to be preferable. The results are shown in Table 1.

TABLE 1

| Sample No. | Rare-Earth Elements R1 Kind: (mole) | R2 Kind: (mole) | Others Kind: (mole) | Specific Permittivity ε | tan δ (%) | IR (Ω) | CR Product (ΩF) | DC Bias (%) | Accelerated Lifetime 10 V/ μm (h) | 17.4 V/ μm (h) | 21.0 V/ μm (h) | Puncture Voltage (V/μm) | Temperature Characteristic X7R |
|---|---|---|---|---|---|---|---|---|---|---|---|---|---|
| 8 | Y:2.0 | Dy:2.0 | — | 2060 | 1.01 | 1.2E+11 | 1900 | −24.3 | 570 | 150 | — | 93 | ○ |
| 9 | Y:2.0 | Tb:2.0 | — | 1990 | 0.79 | 1.8E+11 | 2520 | −22.5 | — | 240 | — | 102 | ○ |
| 16 | Y:2.0 | Gd:2.0 | — | 2020 | 0.91 | 1.5E+11 | 2390 | −26.8 | — | 100 | — | 111 | ○ |
| 17 | Y:2.0 | Eu:2.0 | — | 2080 | 0.91 | 4.9E+10 | 840 | −27.0 | — | 210 | — | 88 | ○ |
| *18 | Y:2.0 | — | Sm:2.0 | 1980 | 0.84 | 1.7E+11 | 2690 | −26.1 | — | 25 | — | 110 | x |
| *1 | Y:2.0 | — | Sc:2.0 | 1930 | 1.04 | 5.4E+10 | 1060 | −20.9 | 70 | — | — | 123 | ○ |
| *2 | Y:2.0, Lu:2.0 | — | — | 1990 | 1.08 | 5.6E+10 | 900 | −19.3 | 40 | — | — | 113 | ○ |
| *3 | Y:2.0, Yb:2.0 | — | — | 1920 | 1.17 | 5.9E+10 | 910 | −22.8 | 50 | — | — | 117 | ○ |
| *4 | Y:2.0, Tm:2.0 | — | — | 2110 | 1.16 | 5.6E+11 | 1040 | −24.8 | 80 | — | — | 115 | ○ |
| *5 | Y:2.0, Er:2.0 | — | — | 2210 | 1.22 | 7.1E+10 | 1230 | −28.9 | 110 | — | — | 114 | ○ |
| *11 | — | Tb:2.0 | — | 2810 | 1.76 | 1.9E+11 | 3990 | −42.3 | — | 40 | — | 91 | x |

Note that,
$BaTiO_3$ = 100 moles
$MgCO_3$ = 2 moles
$MnCO_3$ = 0.4 mole
BaO = 1.8 moles
CaO = 1.2 moles
$SiO_2$ = 3 moles
"*" at sample numbers = comparative example
thickness per one dielectric layer (thickness of interlayer) = 11.5 μm
number of dielectric layers = 4

In Table 1 (including Table 2 to Table 6), "mE+n" means "m×10$^{+n}$" in the insulation resistance (IR) values.

As shown in Table 1, a capacitor sample using a sample of the present example containing R1 (the fourth subcomponent) and R2 (the fifth subcomponent) was proved to satisfy the X7R characteristic and have a sufficiently high specific permittivity and insulation resistance, a fair dielectric loss, and good CR product, DC bias characteristic, high temperature load lifetime and breakdown voltage. The capacitor samples of the present example were confirmed to satisfy the B characteristic of the EIA Standards besides the X7R characteristic.

While, in a capacitor sample using a sample of the comparative example (samples 1 to 5), it was confirmed that the X7R characteristic was satisfied but the high temperature load lifetime or the dielectric loss was deteriorated. Also, in a capacitor sample using a sample of the comparative example (sample 11) wherein only R2 (the fifth subcomponent) was included, it was confirmed that even the X7R characteristic was not satisfied, moreover, characteristics of the dielectric loss, DC bias, breakdown voltage, etc. were deteriorated.

Example 2

Capacitor samples having compositions shown in Table 2 below were prepared in the same way as in the example 1 (note that a thickness per one dielectric layer (an interlayer thickness) was 9.5 μm). Samples of the present example (samples 21 to 23, 23-1) include R1 (fourth subcomponent) and R2 (fifth subcomponent), while samples of a comparative example (samples 24, 19 and 20) include only one of the R1 (fourth subcomponent) and R2 (fifth subcomponent). Note that Sc is further included in the sample 24. In samples of the present example, R2 (fifth subcomponent) was fixed to Tb and a kind of R1 (the fourth subcomponent) was changed. The same measurement was made on these capacitor samples in the same way as in the example 1. The results are shown in Table 2.

TABLE 2

| Sample No. | Rare-Earth Elements R1 Kind: (mole) | R2 Kind: (mole) | Others Kind: (mole) | Specific Permittivity ε | tan δ (%) | IR (Ω) | CR Product (ΩF) | DC Bias (%) | Accelerated Lifetime 10 V/ μm (h) | 17.4 V/ μm (h) | 21.0 V/ μm (h) | Puncture Voltage (V/μm) | Temperature Characteristic X7R |
|---|---|---|---|---|---|---|---|---|---|---|---|---|---|
| 21 | Y:2.0 | Tb:2.0 | — | 2000 | 0.96 | 9.3E+10 | 2000 | −23.2 | — | — | 65 | 112 | ○ |
| 22 | Ho:2.0 | Tb:2.0 | — | 1970 | 0.95 | 1.1E+11 | 1990 | −22.8 | — | — | 55 | 100 | ○ |
| 23 | Er:2.0 | Tb:2.0 | — | 2050 | 1.02 | 6.9E+10 | 1310 | −23.2 | — | — | 30 | 100 | ○ |
| 23-1 | Tm:2.0 | Tb:2.0 | — | 2000 | 1.02 | 6.9E+10 | 1300 | −24.0 | — | — | 25 | 100 | ○ |
| *24 | — | Tb:2.0 | Sc:2.0 | 1950 | 1.20 | 6.8E+10 | 1260 | −27.0 | — | — | 15 | 90 | ○ |
| *19 | Y:4.0 | — | — | 2250 | 1.38 | 5.6E+10 | 1250 | −31.0 | — | — | 10 | 167 | ○ |
| *20 | — | Dy:2.0, Tb:2.0 | — | 2580 | 1.38 | 1.7E+11 | 3970 | −36.2 | — | — | 35 | 72 | x |

Note that,
$BaTiO_3$ = 100 moles
$MgCO_3$ = 2 moles
$MnCO_3$ = 0.4 mole
BaO = 1.8 moles
CaO = 1.2 moles
$SiO_2$ = 3 moles
"*" at sample numbers = comparative example
thickness per one dielectric layer (thickness of interlayer) = 9.5 μm
number of dielectric layers = 4

As shown in Table 2, it was proved that a capacitor sample using a material of the present example including R1 (the fourth subcomponent) and R2 (the fifth subcomponent) satisfies the X7R characteristic, moreover, has sufficiently high specific permittivity and insulation resistance, a fair dielectric loss and good CR product, DC bias characteristic, high temperature load lifetime, and breakdown voltage. The capacitor samples of the present example were confirmed to satisfy the B characteristic of the EIA Standards besides the X7R characteristic.

While, in a capacitor sample using a material of the comparative example (sample 19) wherein only R1 (the fourth subcomponent) was included, it was confirmed that the X7R characteristic was satisfied but the high temperature load lifetime and the dielectric loss were deteriorated. In a capacitor sample using a material of the comparative examples (sample 24) including Sc, it was confirmed that the dielectric loss and the high temperature load lifetime were deteriorated. In a capacitance sample using a material of the comparative example (sample 20) wherein only R2 (the fifth subcomponent) was included, it was confirmed that the dielectric loss, DC bias, puncture bias, temperature dependence of capacitance, etc. were deteriorated.

Fine Structure 1 of Dielectric Ceramic Composition

The fine structure of the respective dielectric ceramic compositions using a sample 9 (Y: 2 mol, Tb: 2 mol) of the present example, a sample 19 (Y: 4 mol), a sample 24 (Tb: 2 mol, Sc: 2 mol) and a sample 18 (Y: 2 mol, Sm: 2 mol) of the comparative examples were analyzed by using an EPMA. Pictures showing a segregation state of Mg are shown respectively in FIG. 2A, FIG. 3A, FIG. 4A and FIG. 5A and pictures showing a segregation state of rare-earth elements are shown respectively in FIG. 2B, FIG. 3B, FIG. 4B and FIG. 5B.

Figure 3A:
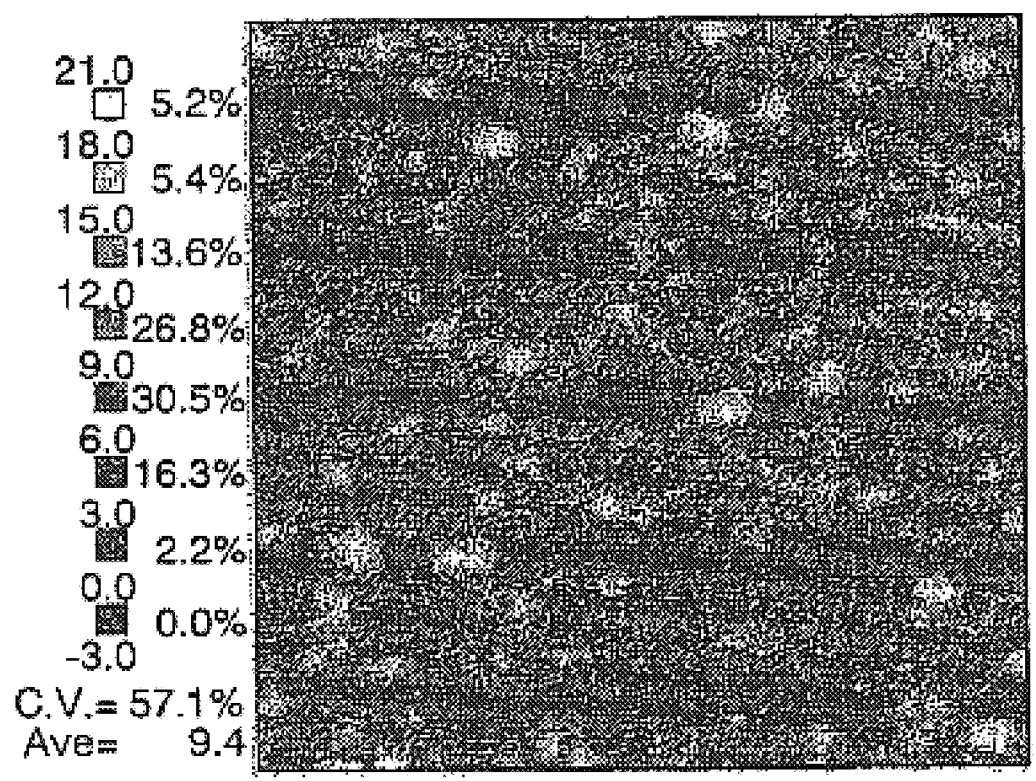
FIG. 3A is a picture of a segregating state of Mg shown by performing EPMA on the fine structure of a dielectric ceramic composition using Sample 19 in a comparative example.
Figure 3B:
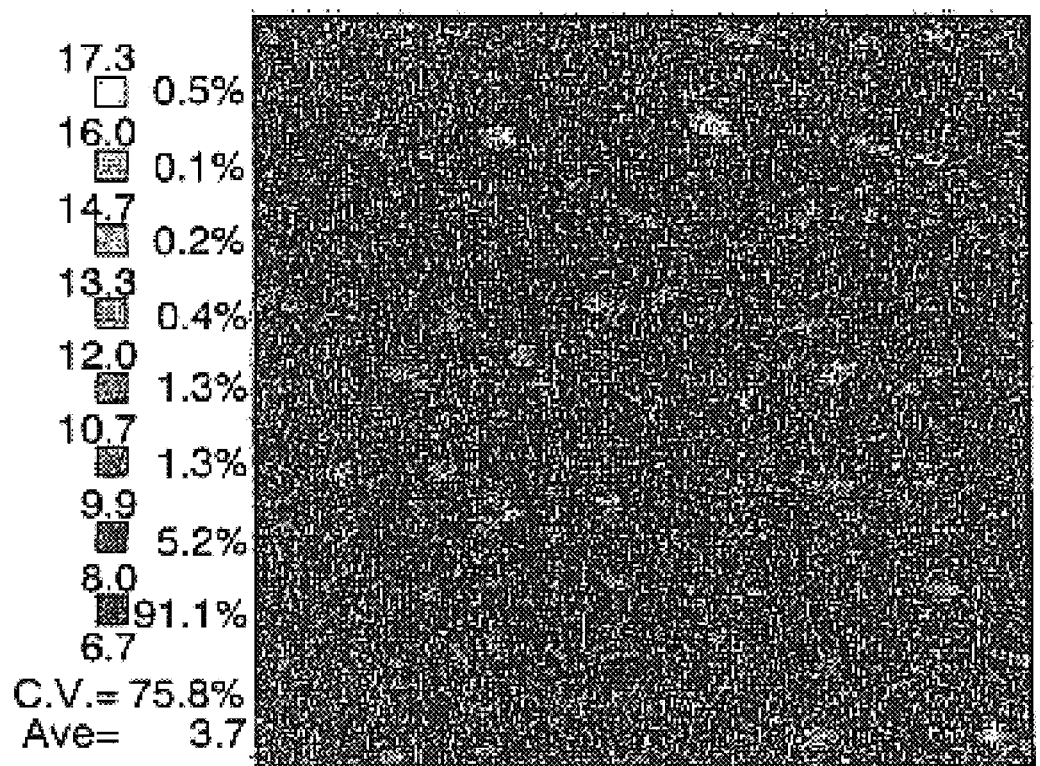
FIG. 3B is a picture of a segregating state of rare-earth elements shown by performing EPMA on the fine structure of a dielectric ceramic composition using the same sample.
Figure 4A:
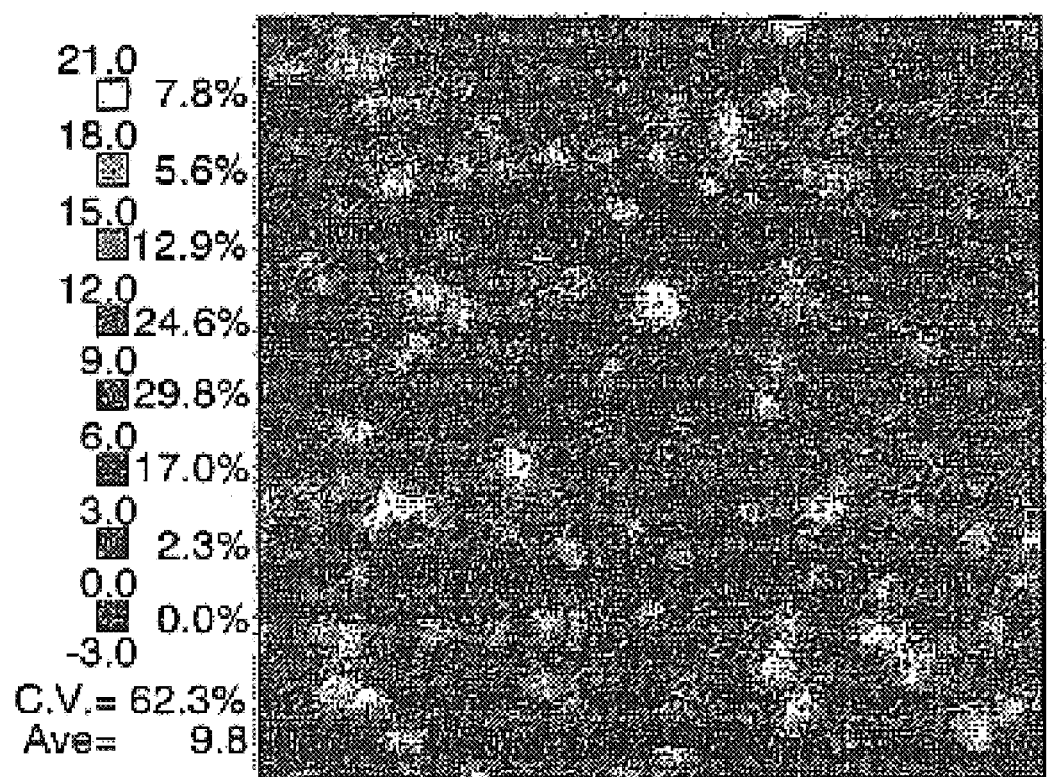
FIG. 4A is a picture of a segregating state of Mg shown by performing EPMA on the fine structure of a dielectric ceramic composition using Sample 24 in a comparative example.
Figure 4B:
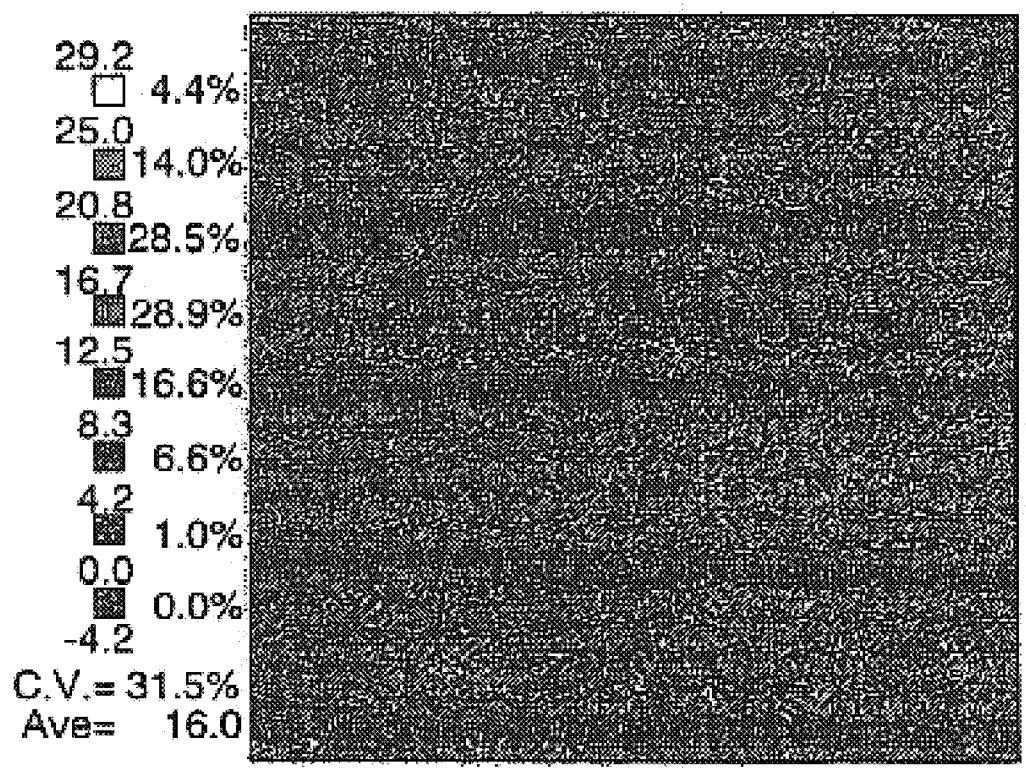
FIG. 4B is a picture of a segregating state of rare-earth elements shown by performing EPMA on the fine structure of a dielectric ceramic composition using the same sample.
Figure 5A:
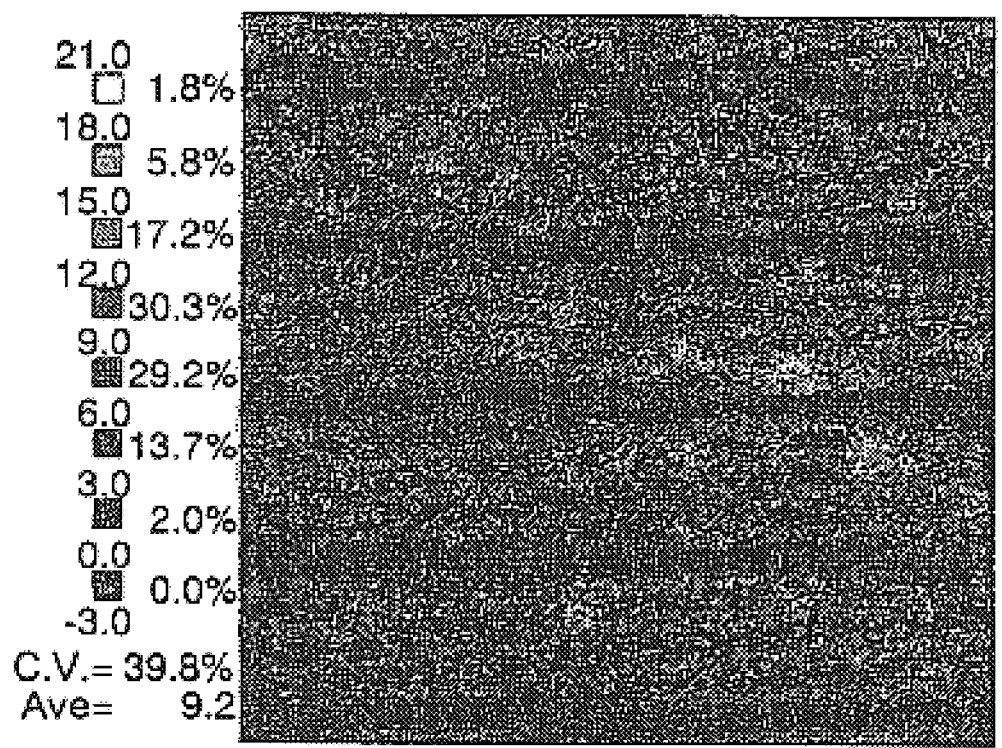
FIG. 5A is a picture of a segregating state of Mg shown by performing EPMA on the fine structure of a dielectric ceramic composition using Sample 18 in a comparative example.
Figure 5B:
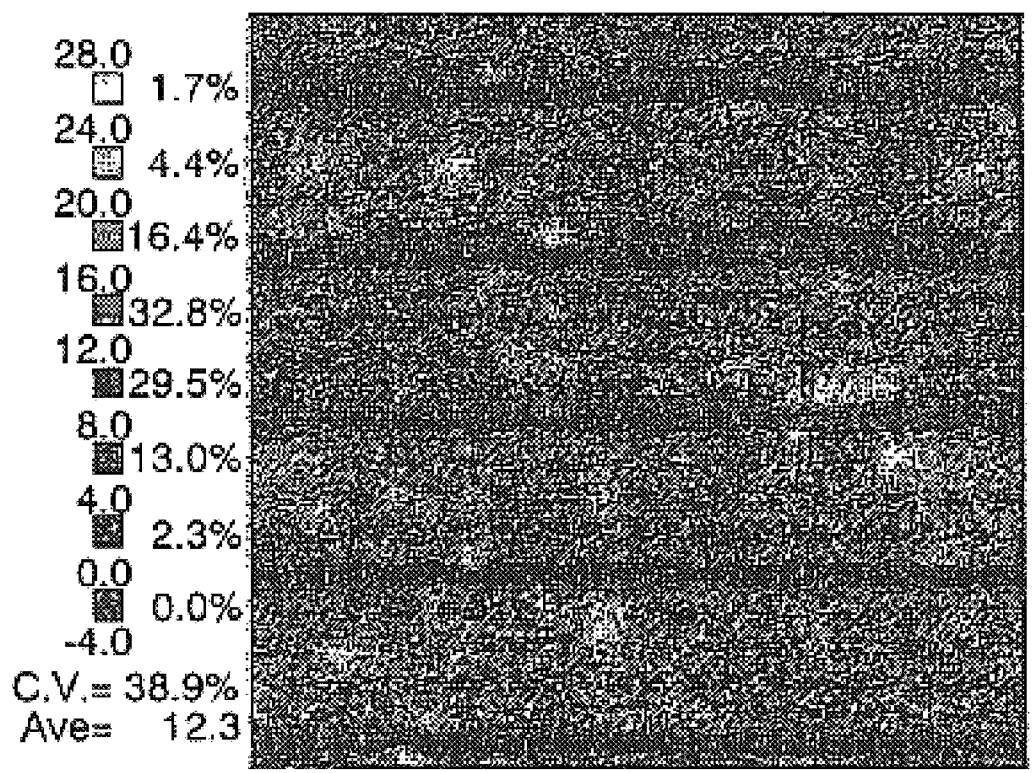
FIG. 5B is a picture of a segregating state of rare-earth elements shown by performing EPMA on the fine structure of a dielectric ceramic composition using the same sample.

As shown in FIG. 3A and FIG. 3B, in the material sample 19 of the comparative example wherein only Y was added as a rare-earth element, segregation of both the rare-earth element and an alkaline earth element (Mg) was exhibited much. As shown in FIG. 4A and FIG. 4B, in the material sample 24 wherein Tb and Sc were added as rare-earth elements, segregation of rare-earth elements were not much but segregation of an alkaline earth element was exhibited much. As shown in FIG. 5A and FIG. 5B, in the material sample 18 of the comparative example wherein Y and Sm were added as rare-earth elements, segregation of an alkaline earth element was not much and segregation of rare-earth elements were exhibited much.

Figure 2A:
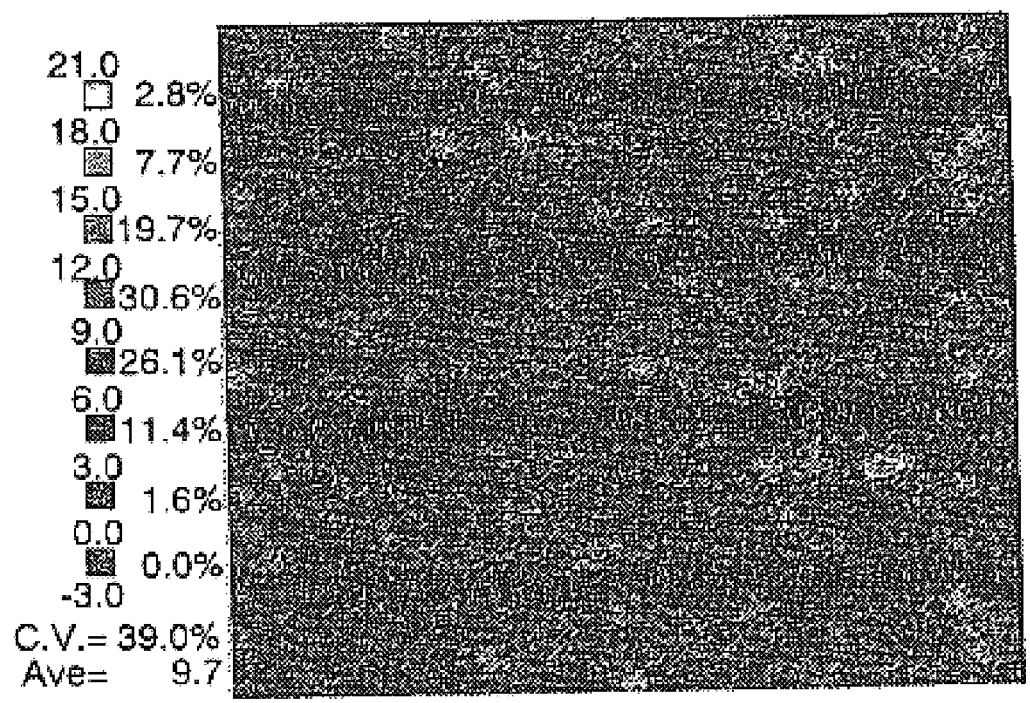
FIG. 2A is a picture of a segregating state of Mg shown by performing EPMA on the fine structure of a dielectric ceramic composition using Sample 9 of the present embodiment.
Figure 2B:
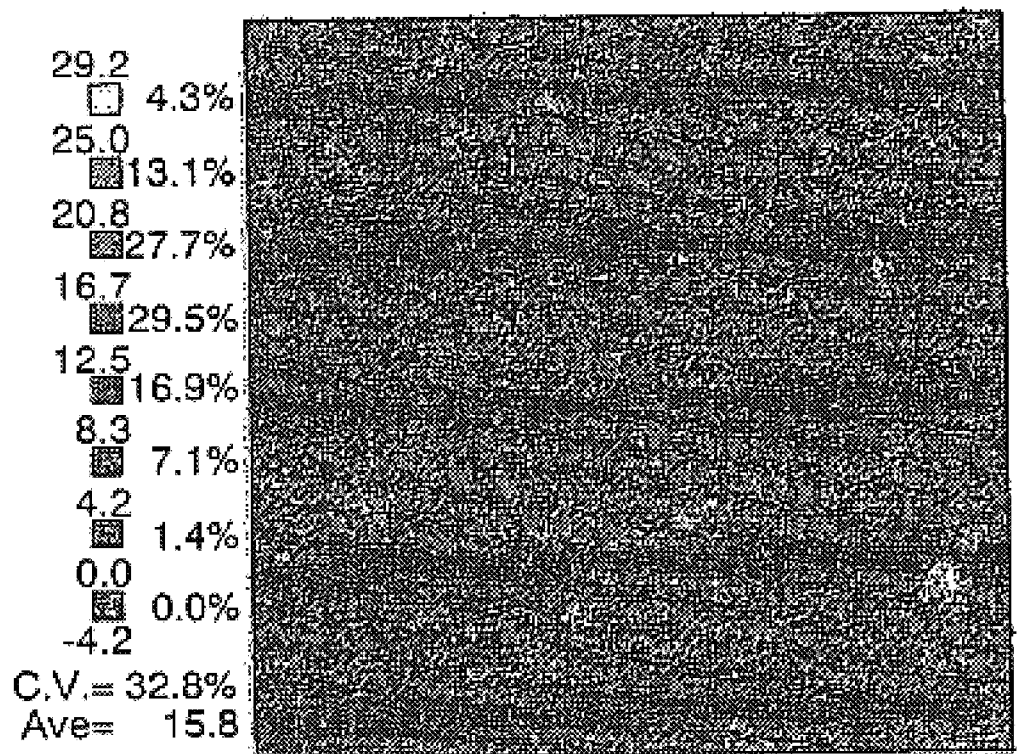
FIG. 2B is a picture of a segregating state of rare-earth elements shown by performing EPMA on the fine structure of a dielectric ceramic composition using the same sample.

While, as shown in FIG. 2A and FIG. 2B, in the sample 9 of the example being added Y and Tb as rare-earth elements, it was confirmed that segregation of both the rare-earth elements and alkaline earth element were suppressed.

Fine Structure 2 of the Dielectric Ceramic Composition

Figure 6:
FIG. 6 is a picture of the fine structure of a dielectric ceramic composition having the same composition as that of Sample 21 of the present embodiment but using Sample 21-1 wherein a particle diameter of $BaTiO_3$ is 1 µm observed by a Transmission Electron Microscope (TEM)

FIG. 6 shows a picture of the fine structure of a dielectric ceramic composition having the same composition as a sample 21 of the present example but using a sample 21-1 wherein the particle diameter of $BaTiO_3$ was 1 μm observed by using a Transmission Electron Microscope (TEM). FIG. 7A shows a schematic view of the fine structure of a dielectric particle included in the dielectric ceramic composition shown in FIG. 6, and FIG. 7B shows a schematic view of an analyzed distribution density (existential quantity) of rare-earth elements R1 and R2 in respective regions of the dielectric particle in FIG. 7A.

Figure 7B:
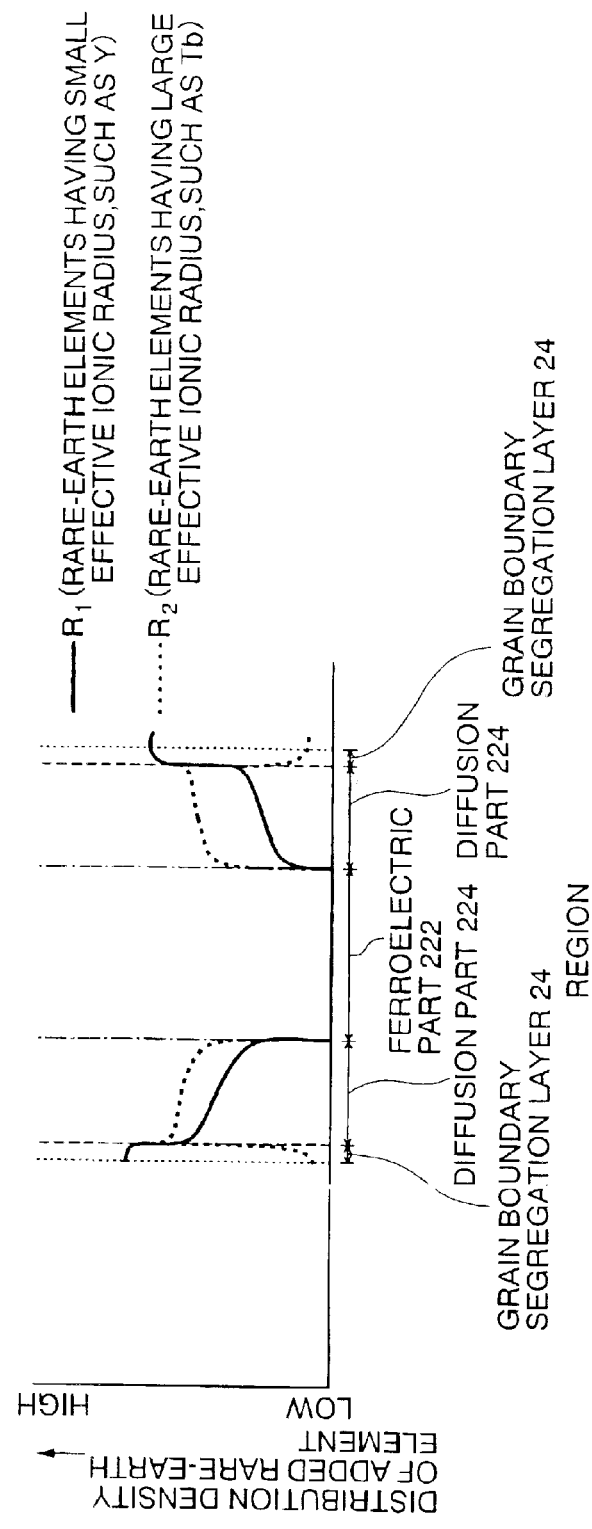
FIG. 7B is a view schematically expressing an analyzed distribution density (existential quantity) of rare-earth elements R1 and R2 in each region of the dielectric particle in FIG. 7A.

From FIG. 6, FIG. 7A and FIG. 7B, it was confirmed that the fine structure of the above dielectric ceramic composition was composed of dielectric particle 22 and a grain boundary segregation part 24 existing around the dielectric particle 22, wherein the dielectric particle 22 comprised a ferroelectric part 222 and a diffusion part 224 existing around the ferroelectric part 222.

As shown in FIG. 7B, it was confirmed that the added rare-earth elements R1 and R2 were substantially not dispersed in the ferroelectric part 222.

Also, it was confirmed that both the rare-earth elements R1 and R2 were dispersed in the diffusion part 224 and the grain boundary segregation part 24.

Furthermore, it was confirmed that R1 was dispersed more than R2 in the grain boundary segregation part 24. Namely, when assuming respective existential quantities of R1 and R2 in the grain boundary segregation part 24 were MBR1 and MBR2, it was confirmed that a relationship of (MBR1/MBR2)>1 was satisfied.

Furthermore, it was confirmed that a value of the ratio of existential quantities of R1 and R2 in the diffusion part 224 (MAR1/MAR2) was smaller than that in the grain boundary segregation part 24 (MBR1/MBR2). Namely, a relationship of (MAR1/MAR2)<(MBR1/MBR2) was confirmed to be satisfied.

Temperature Characteristic 2 of Capacitance

Figure 8:
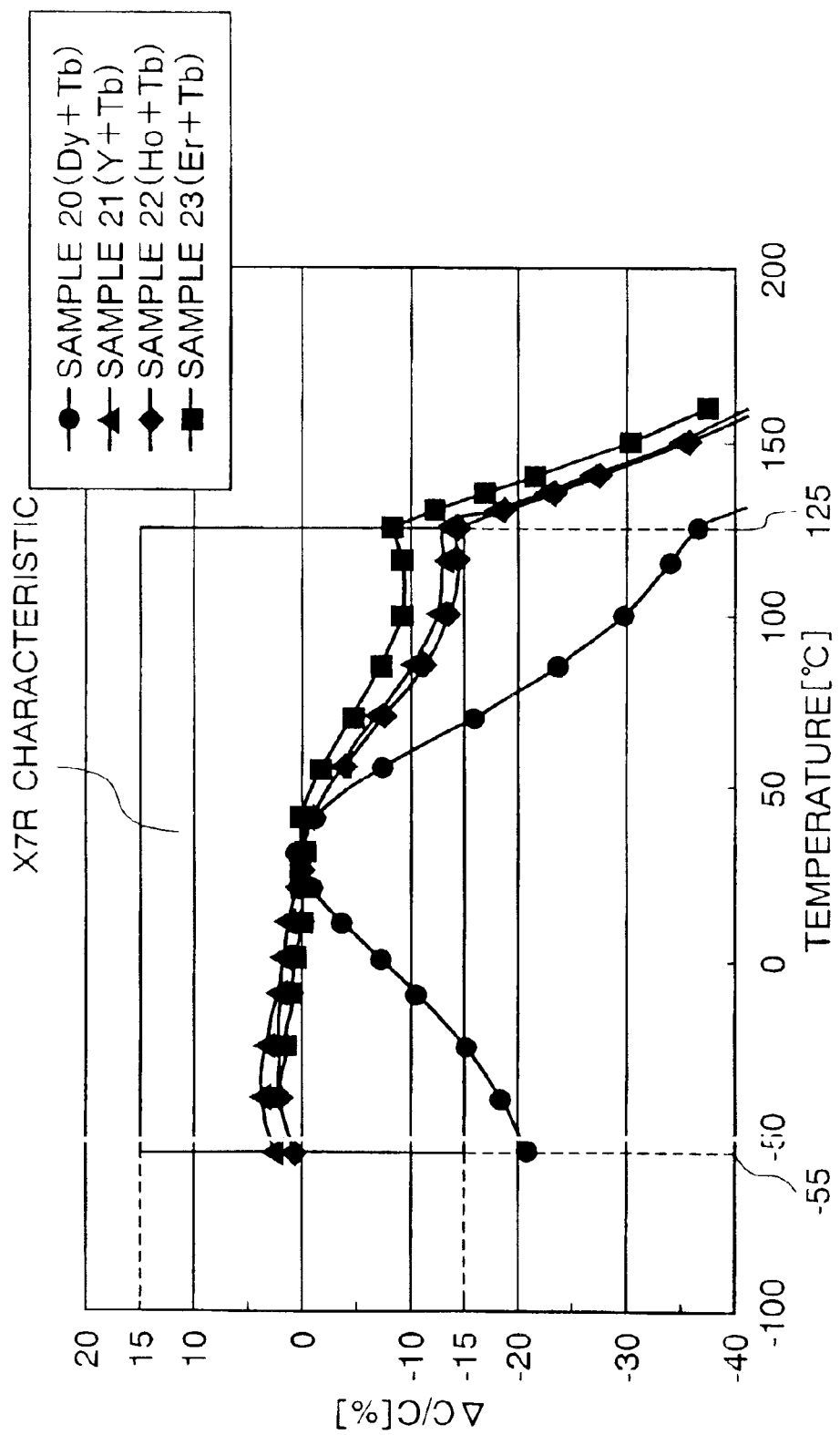
FIG. 8 is a graph of temperature dependence of capacitance of capacitors using respective samples of examples and comparative examples of the present invention.

A capacitor sample (sample 21) including Y+Tb, a capacitor sample (sample 22) including Ho+Tb, a capacitor sample (sample 23) including Er+Tb were selected as examples and a capacitor sample (sample 20) including Dy+Tb was selected as a comparative example of the present invention, and a temperature dependence of capacitance of these capacitance samples at −55° C. to 125° C. was shown in FIG. 8. In FIG. 8, a block range satisfying the X7R characteristic was also indicated. As is clear from FIG. 8, it was understood that preferable temperature dependence of capacitance was exhibited in the samples 21 to 23 of the present example.

Note that the sample 20 of the comparative example shows an upwardly convex curve about the point of the reference temperature of 25° C. When such a curve is drawn, it is considered that a considerable amount of Dy and Tb is dispersed in the ferroelectric part 222 of the dielectric particle 22 explained above.

Example 3

Capacitor samples having compositions shown in Table 3 below were prepared in the same way as in the example 2. In the capacitor samples, a kind and added amount of R1 as the fourth subcomponent and those of R2 as the fifth subcomponent were the same as in the sample 21 of the example 2, but the point that an added amount of $V_2O_5$ was changed was different therefrom. The same measurement as in the example 2 was made on these capacitor samples. The results are shown in Table 3.

TABLE 3

| Sample No. | $V_2O_5$ (mole) | Specific Permittivity $\epsilon$ | tan δ (%) | IR (Ω) | CR Product (ΩF) | DC Bias (%) | Accelerated Lifetime 10 V/ μm (h) | Accelerated Lifetime 17.4 V/ μm (h) | Accelerated Lifetime 21.0 V/ μm (h) | Puncture Voltage (V/μm) | Temperature Characteristic X7R |
|---|---|---|---|---|---|---|---|---|---|---|---|
| 25 | 0.02 | 1990 | 0.91 | 9.2E+10 | 1690 | −20.1 | — | — | 70 | 97 | ○ |
| 26 | 0.04 | 1860 | 0.85 | 9.7E+10 | 1660 | −20.5 | — | — | 75 | 107 | ○ |
| 27 | 0.06 | 1850 | 0.81 | 7.7E+10 | 1290 | −19.9 | — | — | 120 | 110 | ○ |
| 28 | 0.08 | 1870 | 0.78 | 5.6E+10 | 1010 | −19.0 | — | — | 130 | 90 | ○ |

Note that,
$BaTiO_3$ = 100 moles
$MgCO_3$ = 2 moles
$MnCO_3$ = 0.4 moles
BaO = 1.8 moles
CaO = 1.2 moles
$SiO_2$ = 3 moles
$Y_2O_3$ = 1.0 mole, that is, Y(R1) = 2.0 moles
$Tb_2O_3$ = 1.0 mole, that is, Tb(R2) = 2.0 moles
thickness per one dielectric layer (thickness of interlayer) = 9.5 μm
number of dielectric layers = 4

As shown in Table 3, by increasing an additive amount of $V_2O_5$ to a predetermined amount, the high temperature load lifetime was confirmed to have a tendency of improving.

Example 4

Capacitor samples having compositions shown in Table 4 below were prepared. In the capacitor samples, a kind of R1 as the fourth subcomponent and a kind of R2 as the fifth subcomponent were the same as in the sample 9 of the example 1, but the point that additive amounts of R1 and R2 were changed was different. The same measurement as in the example 1 was made on these capacitor samples. The results are shown in Table 4. Note that the sample 21 in Table 2 was also listed.

As shown in Table 4, when Y (R1) is added much (sample 30), the X7R characteristic is satisfied but the high temperature load lifetime tends to deteriorate. While, as an amount of Tb (R2) increases (samples 21 and 32), the high temperature load lifetime tends to improve. However, when Tb is too much, the temperature dependence of capacitance and the high temperature load lifetime tend to deteriorate.

Example 5

Capacitor samples having compositions shown in Table 5 were prepared in the same way as in the example 1. These capacitor samples show the case of using a plurality of R1 as the fourth subcomponent (samples 33 and 34). The same measurement as in the example 1 was made on the capacitor samples. The results are shown in Table 5.

TABLE 4

| Sample No. | Rare-Earth Elements R1 Kind: (mole) | Rare-Earth Elements R2 Kind: (mole) | Rare-Earth Elements Others Kind: (mole) | Specific Permittivity $\epsilon$ | tan δ (%) | IR (Ω) | CR Product (ΩF) | DC Bias (%) | Accelerated Lifetime 10 V/ μm (h) | Accelerated Lifetime 17.4 V/ μm (h) | Accelerated Lifetime 21.0 V/ μm (h) | Puncture Voltage (V/μm) | Temperature Characteristic X7R |
|---|---|---|---|---|---|---|---|---|---|---|---|---|---|
| 30 | Y:3.0 | Tb:1.0 | — | 2080 | 1.05 | 1.1E+11 | 1730 | −23.9 | — | — | 11 | 135 | ○ |
| 21 | Y:2.0 | Tb:2.0 | — | 2000 | 0.96 | 9.3E+10 | 2000 | −23.2 | — | — | 65 | 112 | ○ |
| 32 | Y:1.8 | Tb:2.2 | — | 2000 | 0.90 | 1.2E+11 | 2260 | −24.2 | — | — | 60 | 105 | ○ |

Note that,
$BaTiO_3$ = 100 moles
$MgCO_3$ = 2 moles
$MnCO_3$ = 0.4 mole
BaO = 1.8 mole
CaO = 1.2 moles
$SiO_2$ = 3 moles
thickness per one dielectric layer (thickness of interlayer) = 9.5 μm
number of dielectric layers = 4

TABLE 5

| Sample No. | Rare-Earth Elements | | | Specific Permittivity ε | tan δ (%) | IR (Ω) | CR Product (ΩF) | DC Bias (%) | Accelerated Lifetime | | | Puncture Voltage (V/μm) | Temperature Characteristic X7R |
| | R1 Kind: (mole) | R2 Kind: (mole) | Others Kind: (mole) | | | | | | 10 V/ μm (h) | 17.4 V/ μm (h) | 21.0 V/ μm (h) | | |
| --- | --- | --- | --- | --- | --- | --- | --- | --- | --- | --- | --- | --- | --- |
| 33 | Y:1.0, Er:1.0 | Tb:2.0 | — | 2030 | 0.98 | 7.0E+10 | 1330 | −23.3 | — | — | 55 | 84 | ○ |
| 34 | Y:1.0, Er:1.0 | Gd:2.0 | — | 1900 | 0.88 | 1.0E+11 | 1950 | −29.7 | — | — | 60 | 96 | ○ |

Note that,
$BaTiO_3$ = 100 moles
$MgCO_3$ = 2 moles
$MnCO_3$ = 0.4 mole
BaO = 1.8 mole
CaO = 1.2 moles
$SiO_2$ = 3 moles
thickness per one dielectric layer (thickness of interlayer) = 9.5 μm
number of dielectric layers = 4

As shown in Table 5, not only in the case of adding two kinds of rare-earth elements but in the case of adding three kinds or more of rare-earth elements, the effects of the present invention can be obtained if kinds of the rare-earth elements are selected so as to satisfy the range regulated in the present invention (about a effective ionic radius when having a coordination number of nine).

Example 6

Capacitor samples having compositions shown in Table 6 were prepared in the same way as in the example 1. These samples show the case of changing an amount of Mn as the sixth subcomponent (samples 35 to 37). The same measurement as in the example 1 was made on the capacitor samples. The results are shown in Table 6.

TABLE 6

| Sample No. | MnO (mole) | Specific Permittivit ε | tan δ (%) | IR (Ω) | CR (ΩF) | Accelerated Lifetime 21.0 V/ μm (h) | Puncture Voltage (V/μm) | Temperature Characteristic X7R |
| --- | --- | --- | --- | --- | --- | --- | --- | --- |
| 35 | 0.2 | 1960 | 0.98 | 1.3E+11 | 2120 | 70 | 104 | ○ |
| 36 | 0.25 | 1850 | 0.94 | 1.0E+11 | 1600 | 60 | 95 | ○ |
| 37 | 0.4 | 1840 | 0.94 | 9.4E+10 | 1530 | 23 | 108 | ○ |

Note that,
BaTiO3 100 mol
MgCO3 2 mol
BaO 1.8 mol
CaO 1.2 mol
SiO2 3 mol
V2O5 0.01 mol
Y2O3 1.0 mol
Tb2O3 1.0 mol
thickness per one dielectric laye 9.5 μm
the number of dielectric layers  4

As shown in Table 6, it is understood that the CR product can be improved by making the amount of Mn 0.2 mol, that is, less than 0.25 mol.

What is claimed is:

1. A dielectric ceramic composition, comprising:
a main component including barium titanate;
a fourth subcomponent including an oxide of R1, wherein R1 is at least one kind selected from a first element group composed of rare-earth elements having an effective ionic radius of less than 108 pm when having a coordination number of nine; and
a fifth subcomponent including an oxide of R2, wherein R2 is at least one kind selected from a second element group composed of rare-earth elements having an effective ionic radius of 108 pm to 113 pm when having a coordination number of nine;
wherein a diffusion part at least including said R1 and R2 exists inside respective dielectric particles composing said dielectric ceramic composition;
wherein said dielectric particles comprise a ferroelectric part substantially not including said R1 and R2 and a diffusion part existing around the ferroelectric part;
a grain boundary segregation part exists around the diffusion part;
said diffusion part and grain boundary segregation part include at least said R1 and R2; and
when assuming respective existential quantities of R1 and R2 in said diffusion part are MAR1 and MAR2 and respective existential quantities of R1 and R2 in said grain boundary segregation part are MBR1 and MBR2, relationships of (MBR1/MBR2)>1 and (MAR1/MAR2)<(MBR1/MBR2).

2. The dielectric ceramic composition as set forth in claim 1, wherein the effective ionic radius of rare-earth elements composing said first element group is over 106 pm.

3. The dielectric ceramic composition as set forth in claim 2, wherein when assuming the effective ionic radius of rare-earth elements composing said first element group is r1 and the effective ionic radius of rare-earth elements composing said second element group is r2, said first element group and said second element group are composed so that a ratio of r1 and r2 (r2/r1) satisfies a relationship of 1.007<r2/r1<1.06.

4. The dielectric ceramic composition as set forth in claim 1, wherein a ratio of a total of the fourth subcomponent and the fifth subcomponent to 100 mol of said main component is 10 mol or less, and wherein the number of mole of the fourth subcomponent and the fifth subcomponent is a ratio of R1 and R2 alone.

5. The dielectric ceramic composition as set forth in claim 1, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

6. The dielectric ceramic composition as set forth in claim 1, further comprising a first subcomponent including at least one kind selected from MgO, CaO, SrO and BaO;
wherein a ratio of the first subcomponent to 100 mol of said main component is 0.1 to 5 mol.

7. The dielectric ceramic composition as set forth in claim 1, further comprising a second subcomponent including a sintering aid comprised of $SiO_2$;
wherein a ratio of the second subcomponent to 100 mol of said main component is 2 to 10 mol.

8. The dielectric ceramic composition as set forth in claim 7, wherein said sintering aid is $(Ba, Ca)x\ SiO_{2+x}$, wherein x=0.8 to 1.2.

9. The dielectric ceramic composition as set forth in claim 1, further comprising a third subcomponent including at least one kind selected from $V_2O_5$, $MoO_3$ and $WO_3$;
wherein a ratio of the third subcomponent to 100 mol of said main component is 0.5 mol or less.

10. The dielectric ceramic composition as set forth in claim 1, further comprising a sixth subcomponent including at least one of MnO and $Cr_2O_3$;
wherein a ratio of the sixth subcomponent to 100 mol of said main component is 0.5 mol or less.

11. The dielectric ceramic composition as set forth in claim 1, wherein a value of(MAR1/MAR2) in said diffusion part gradually decreases as getting close to said ferroelectric part side from said grain boundary segregation part side.

12. A dielectric ceramic composition, comprising:
a main component including barium titanate;
a fourth subcomponent including an oxide of R1, wherein R1 is at least one kind selected from a first element group composed of rare-earth elements having an effective ionic radius of less than 108 pm when having a coordination number of nine, and at least includes Y;
a fifth subcomponent including an oxide of R2, wherein R2 is at least one kind selected from a second element group composed of rare-earth elements having an effective ionic radius of 108 pm to 113 pm when having a coordination number of nine.

13. The dielectric ceramic composition as set forth in claim 12, wherein when assuming the effective ionic radius of Y included in said first element group is ry and the effective ionic radius of rare-earth elements composing said second element group is r2, said second element group is composed so that a ratio of ry and r2 (r2/ry) satisfies a relationship of 1.007<(r2/ry)<1.05.

14. The dielectric ceramic composition as set forth in claim 12, wherein when assuming the effective ionic radius of Y included in said first element group is ry and the effective ionic radius of rare-earth elements composing said second element group is r2, said second element group is composed so that a ratio of ry and r2 (r2/ry) satisfies a relationship of 1.007<(r2/ry)<1.03.

15. The dielectric ceramic composition as set forth in claim 12, wherein a ratio of the fifth subcomponent to 100 mol of said main component is a ratio of Y or more.

16. The dielectric ceramic composition as set forth in claim 12, wherein a ratio of a total of the fourth subcomponent and the fifth subcomponent to 100 mol of said main component is 10 mol or less, and wherein the number of mole of the fourth subcomponent and the fifth subcomponent is a ratio of R1 and R2 alone.

17. The dielectric ceramic composition as set forth in claim 12, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

18. The dielectric ceramic composition as set forth in claim 12, further comprising a first subcomponent including at least one kind selected from MgO, CaO, SrO and BaO;
wherein a ratio of the first subcomponent to 100 mol of said main component is 0.1 to 5mol.

19. The dielectric ceramic composition as set forth in claim 12, further comprising a second subcomponent including a sintering aid comprised of $SiO_2$;
wherein a ratio of the second subcomponent to 100 mol of said main component is 2 to 10 mol.

20. The dielectric ceramic composition as set forth in claim 19, wherein said sintering aid is $(Ba, Ca)x\ SiO_{2+x}$, wherein x=0.8 to 1.2.

21. The dielectric ceramic composition as set forth in claim 12, further comprising a third subcomponent including at least one kind selected from $V_2O_5$, $MoO_3$ and $WO_3$;
wherein a ratio of the third subcomponent to 100 mol of said main component is 0.5 mol or less.

22. The dielectric ceramic composition as set forth in claim 12, further comprising a sixth subcomponent including at least one of MnO and $Cr_2O_3$;
wherein a ratio of the sixth subcomponent to 100 mol of said main component is 0.5 mol or less.

23. The dielectric ceramic composition as set forth in claim 12, wherein a diffusion part at least including said R1 and R2 exists inside respective dielectric particles composing said dielectric ceramic composition.

24. The dielectric ceramic composition as set forth in claim 23, wherein
said dielectric particles comprise a ferroelectric part substantially not including said R1 and R2 and a diffusion part existing around the ferroelectric part;
a grain boundary segregation part exists around the diffusion part;
said diffusion part and grain boundary segregation part includes at least said R1 and R2; and
when assuming respective existential quantities of R1 and R2 in said diffusion part are MAR1 and MAR2 and respective existential quantities of R1 and R2 in said grain boundary segregation part are MBR1 and MBR2, relationships of(MBR1/MBR2)>1 and (MAR1/MAR2)<(MBR1/MBR2).

25. The dielectric ceramic composition as set forth in claim 24, wherein a value of (MAR1/MAR2) in said diffusion part gradually decreases as getting close to ferroelectric part side from said grain boundary segregation part side.

26. A dielectric ceramic composition, comprising:
a main component including barium titanate;
a fourth subcomponent including an oxide of R1, wherein R1 is at least one kind selected from a first element group composed of rare-earth elements having an effective ionic radius of less than 108 pm when having a coordination number of nine; and
a fifth subcomponent including an oxide of R2, wherein R2 is at least one kind selected from a second element group composed of rare-earth elements having an effective ionic radius of 108 pm to 113 pm when having a coordination number of nine and at least includes Tb;
wherein a diffusion part at least including said R1 and R2 exists inside respective dielectric particles composing said dielectric ceramic composition;
wherein said dielectric particles comprise a ferroelectric part substantially not including said R1 and R2 and a diffusion part existing around the ferroelectric part; a grain boundary segregation part exists around the diffusion part;
said diffusion part and grain boundary segregation part includes at least said R1 and R2; and
when assuming respective existential quantities of R1 and R2 in said diffusion part are MAR1 and MAR2 and respective existential quantities of R1 and R2 in said grain boundary segregation part are MBR1 and MBR2, relationships of (MBR1/MBR2)>1 and (MAR1/MAR2)<(MBR1/MBR2).

27. The dielectric ceramic composition as set forth in claim 26, wherein when assuming the effective ionic radius of the rare-earth elements composing said first element group is r1 and the effective ionic radius of Tb included in said second element group is rtb, said first element group is composed so that a ratio of r1 and rtb (rtb/r1) satisfies a relationship of 1.018<(rtb/r1)<1.062.

28. The dielectric ceramic composition as set forth in claim 26, wherein when assuming the effective ionic radius of the rare-earth elements composing said first element group is r1 and the effective ionic radius of Tb included in said second element group is rtb, said first element group is composed so that a ratio of r1 and rtb (rtb/r1) satisfies a relationship of 1.018<(rtb/r1)<1.022.

29. The dielectric ceramic composition as set forth in claim 26, wherein a ratio of a total of the fourth subcomponent and the fifth subcomponent to 100 mol of said main component is 10 mol or less, and wherein the number of mole of the fourth subcomponent and the fifth subcomponent is a ratio of R1 and R2 alone.

30. The dielectric ceramic composition as set forth in claim 26, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

31. The dielectric ceramic composition as set forth in claim 26, further comprising a first subcomponent including at least one kind selected from MgO, CaO, SrO and BaO;
wherein a ratio of the first subcomponent to 100 mol of said main component is 0.1 to 5mol.

32. The dielectric ceramic composition as set forth in claim 26, further comprising a second subcomponent including a sintering aid comprised of $SiO_2$;
wherein a ratio of the second subcomponent to 100 mol of said main component is 2 to 10 mol.

33. The dielectric ceramic composition as set forth in claim 32, wherein said sintering aid is $(Ba, Ca)_x SiO_{2+x}$, wherein x=0.8 to 1.2.

34. The dielectric ceramic composition as set forth in claim 26, further comprising a third subcomponent including at least one kind selected from $V_2O_5$, $MoO_3$ and $WO_3$;
wherein a ratio of the third subcomponent to 100 mol of said main component is 0.5 mol or less.

35. The dielectric ceramic composition as set forth in claim 26, further comprising a sixth subcomponent including at least one of MnO and $Cr_2O_3$;
wherein a ratio of the sixth subcomponent to 100 mol of said main component is 0.5 mol or less.

36. The dielectric ceramic composition as set forth in claim 26, wherein a value of (MAR1/MAR2) in said diffusion part gradually decreases as getting close to said ferroelectric part side from said grain boundary segregation part side.

37. A multi-layer ceramic capacitor comprising a capacitor element body comprised of alternately stacked dielectric layers composed of a dielectric ceramic composition and internal electrode layers, wherein:
said dielectric ceramic composition comprises
a main component including barium titanate;
a fourth subcomponent including an oxide of R1, wherein R1 is at least one kind selected from a first element group composed of rare-earth elements having an effective ionic radius of less than 108 pm when having a coordination number of nine and at least includes Y; and
a fifth subcomponent including an oxide of R2, wherein R2 is at least one kind selected from a second element group composed of rare-earth elements having an effective ionic radius of 108 pm to 113 pm when having a coordination number of nine;
wherein a conductive material included in said internal electrode layer is Ni or a Ni alloy.

38. A dielectric ceramic composition, comprising:
a main component including barium titanate;
a first subcomponent including MgO;
a second subcomponent including a sintering aid comprised of $SiO_2$;
a third subcomponent including $V_2O_5$;
a fourth subcomponent including an oxide of R1, wherein R1 is Y;
a fifth subcomponent including an oxide R2, wherein R2 is at least one kind selected from Dy, Tb and Gd; and
a sixth subcomponent including MnO;
wherein ratios of the respective subcomponents to 100 mol of said main component are
the first subcomponent: 0.1 to 5 mol,
the second subcomponent: 2 to 10 mol
the third subcomponent: 0.5 mol or less, and
the sixth subcomponent: less than 0.25 mol; and
a diffusion part including at least said R1 and R2 exists inside respective dielectric particles composing said dielectric ceramic composition;
wherein said dielectric particles comprise a ferroelectric part substantially not including said R1 and R2 and a diffusion part existing around the ferroelectric part;
a grain boundary segregation part exists around the diffusion part;
said diffusion part and grain boundary segregation part include at least said R1 and R2; and
when assuming respective existential quantities of R1 and R2 in said diffusion part are MAR1 and MAR2 and respective existential quantities of R1 and R2 in said grain boundary segregation part are MBR1 and MBR2 relationships of (MBR1/MBR2)>1 and (MAR1/MAR2)<(MBR1/MBR2) are satisfied.

39. The dielectric ceramic composition as set forth in claim 38, wherein a value of (MAR1/MAR2) in said diffusion part gradually decreases as getting close to said ferroelectric part side from said grain boundary segregation part side.

40. The dielectric ceramic composition as set forth in claim 38, wherein said sintering aid is $(Ba, Ca)_x SiO_{2+x}$, wherein x=0.8 to 1.2.

41. The dielectric ceramic composition as set forth in claim 38, wherein said sintering aid is $(Ba, Ca)_x SiO_{2+x}$, wherein x=0.8 to 1.2.

42. The dielectric ceramic composition as set forth in claim 38, wherein said sintering aid is $(Ba, Ca)_x SiO_{2+x}$, wherein x=0.8 to 1.2.

43. A multi-layer ceramic capacitor comprising a capacitor element body comprised of alternately stacked dielectric layers composed of a dielectric ceramic composition and internal electrode layers having as a main component a conductive material composed of Ni or a Ni alloy, wherein
said dielectric ceramic composition comprises
a main component including barium titanate;
a first subcomponent including MgO;
a second subcomponent including a sintering aid comprised of $SiO_2$;
a third subcomponent including $V_2O_5$;
a fourth subcomponent including an oxide of R1, wherein R1 is Y;
a fifth subcomponent including an oxide of R2, wherein R2 is at least one kind selected from Dy, Tb and Gd; and
a sixth subcomponent including MnO;
wherein ratios of the respective subcomponents to 100 mol of said main component are
the first subcomponent: 0.1 to 5 mol,
the second subcomponent: 2 to 10 mol
the third subcomponent: 0.5 mol or less,
a total of the fourth subcomponent and the fifth subcomponent: 10 mol or less, wherein the number of mole of the fourth subcomponent and the fifth subcomponent is a ratio of R1 and R2 alone, and
the sixth subcomponent: less than 0.25 mol;
wherein a rated voltage is 100V or more.

44. The multi-layer ceramic capacitor as set forth in claim 43, wherein said sintering aid is $(Ba, Ca)_x SiO_{2+x}$, wherein x=0.8 to 1.2.

45. A multi-layer ceramic capacitor comprising a capacitor element body comprised of alternately stacked dielectric layers composed of a dielectric ceramic composition and internal electrode layers having as a main component a conductive material composed of Ni or a Ni alloy, wherein
said dielectric ceramic composition comprises
a main component including barium titanate;
a first subcomponent including MgO;
a second subcomponent including a sintering aid comprised of $SiO_2$;
a third subcomponent including $V_2O_5$;
a fourth subcomponent including an oxide of R1, wherein R1 is Y;
a fifth subcomponent including an oxide of R2, wherein R2 is at least one kind selected from Dy, Tb and Gd; and
a sixth subcomponent including MnO;
wherein ratios of the respective subcomponents to 100 mol of said main component are
the first subcomponent: 0.1 to 5 mol,
the second subcomponent: 2 to 10 mol
the third subcomponent: 0.5 mol or less,
the fourth subcomponent: 0.1 to 10 mol, wherein the number of mole of the fourth subcomponent is a ratio of R1 alone,
the fifth subcomponent: 0.1 to 10 mol, wherein the number of mole of the fifth subcomponent is a ratio of R2 alone, and
the sixth subcomponent: less than 0.25 mol;
wherein a rated voltage is 100V or more.

46. The multi-layer ceramic capacitor as set forth in claim 45, wherein said sintering aid is $(Ba, Ca)_x SiO_{2+x}$, wherein x=0.8 to 1.2.

47. A multi-layer ceramic capacitor comprising a capacitor element body comprised of alternately stacked dielectric layers composed of a dielectric ceramic composition and internal electrode layers having as a main component a conductive material composed of Ni or a Ni alloy, wherein
said dielectric ceramic composition comprises
a main component including barium titanate;
a first subcomponent including MgO;
a second subcomponent including a sintering aid comprised of $SiO_2$;
a third subcomponent including $V_2O_5$;
a fourth subcomponent including an oxide of R1, wherein R1 is Y;
a fifth subcomponent including an oxide of R2, wherein R2 is at least one kind selected from Dy, Tb and Gd; and
a sixth subcomponent including MnO;
wherein ratios of the respective subcomponents to 100 mol of said main component are
the first subcomponent: 0.1 to 5 mol,
the second subcomponent: 2 to 10 mol
the third subcomponent: 0.5 mol or less, and
the sixth subcomponent: less than 0.25 mol; and
a diffusion part including at least said R1 and R2 exists inside respective dielectric particles composing said dielectric ceramic composition;
wherein a rated voltage is 100V or more.

48. The multi-layer ceramic capacitor as set forth in claim 47, wherein said sintering aid is $(Ba, Ca)_x SiO_{2+x}$, wherein x=0.8 to 1.2.

49. A dielectric ceramic composition, comprising:
a main component including barium titanate;
a fourth subcomponent including an oxide of R1, wherein R1 is at least one kind selected from a first element group composed of rare-earth elements having an effective ionic radius of less than 108 pm when having a coordination number of nine; and
a fifth subcomponent including an oxide of R2, wherein R2 is at least one kind selected from a second element group composed of rare-earth elements having an effective ionic radius of 108 pm to 113 pm when having a coordination number of nine;
wherein the effective ionic radius of rare-earth elements composing said first element group is over 106 pm.

50. The dielectric ceramic composition as set forth in claim 49, wherein when assuming the effective ionic radius of rare-earth elements composing said first element group is r1 and the effective ionic radius of rare-earth elements composing said second element group is r2, said first element group and said second element group are composed so that a ratio of r1 and r2 (r2/r1) satisfies a relationship of $1.007<r2/r1<1.06$.

51. The dielectric ceramic composition as set forth in claim 49, wherein a ratio of a total of the fourth subcomponent and the fifth subcomponent to 100 mol of said main component is 10 mol or less, and wherein the number of mole of the fourth subcomponent and the fifth subcomponent is a ratio of R1 and R2 alone.

52. The dielectric ceramic composition as set forth in claim 49, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

53. A dielectric ceramic composition, comprising:
a main component including barium titanate;
a fourth subcomponent including an oxide of R1, wherein R1 is at least one kind selected from a first element group composed of rare-earth elements having an effective ionic radius of less than 108 pm when having a coordination number of nine, and at least includes Y;
a fifth subcomponent including an oxide of R2, wherein R2 is at least one kind selected from a second element group composed of rare-earth elements having an effective ionic radius of 108 pm to 113 pm when having a coordination number of nine;
wherein the effective ionic radius of rare-earth elements composing said first element group is over 106 pm.

54. The dielectric ceramic composition as set forth in claim 53, wherein when assuming the effective ionic radius of Y included in said first element group is ry and the effective ionic radius of rare-earth elements composing said second element group is r2, said second element group is composed so that a ratio of ry and r2 (r2/ry) satisfies a relationship of $1.007<(r2/ry)<1.03$.

55. The dielectric ceramic composition as set forth in claim 53, wherein a ratio of the fifth subcomponent to 100 mol of said main component is a ratio of Y or more.

56. The dielectric ceramic composition as set forth in claim 53, wherein a ratio of a total of the fourth subcomponent and the fifth subcomponent to 100 mol of said main component is 10 mol or less, wherein the number of mole of the fourth subcomponent and the fifth subcomponent is a ratio of R1 and R2 alone.

57. The dielectric ceramic composition as set forth in claim 53, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

58. An electronic device comprising a dielectric layer composed of a dielectric ceramic composition, wherein:
said dielectric ceramic composition comprises
a main component including barium titanate;
a fourth subcomponent including an oxide of R1, wherein R1 is at least one kind selected from a first element group composed of rare-earth elements having an effective ionic radius of less than 108 pm when having a coordination number of nine; and
a fifth subcomponent including an oxide of R2, wherein R2 is at least one kind selected from a second element group composed of rare-earth elements having an effective ionic radius of 108 pm to 113 pm when having a coordination number of nine;
wherein a diffusion part at least including said R1 and R2 exists inside respective dielectric particles composing said dielectric ceramic composition;
wherein said dielectric particles comprise a ferroelectric part substantially not including said R1 and R2 and a diffusion part existing around the ferroelectric part;
a grain boundary segregation part exists around the diffusion part;
said diffusion part and grain boundary segregation part include at least said R1 and R2; and
when assuming respective existential quantities of R1 and R2 in said diffusion part are MAR1 and MAR2 and respective existential quantities of R1 and R2 in said grain boundary segregation part are MBR1 and MBR2, relationships of $(MBR1/MBR2)>1$ and $(MAR1/MAR2)<(MBR1/MBR2)$.

59. The electronic device as set forth in claim 58, wherein the effective ionic radius of rare-earth elements composing said first element group is over 106 pm.

60. The electronic device as set forth in claim 58, wherein a ratio of a total of the fourth subcomponent and the fifth subcomponent to 100 mol of said main component is 10 mol or less, and wherein the number of mole of the fourth subcomponent and the fifth subcomponent is a ratio of R1 and R2 alone.

61. The electronic device as set forth in claim 58, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

62. An electronic device comprising a dielectric layer composed of a dielectric ceramic composition, wherein:
said dielectric ceramic composition comprises
a main component including barium titanate;
a fourth subcomponent including an oxide of R1, wherein R1 is at least one kind selected from a first element group composed of rare-earth elements having an effective ionic radius of less than 108 pm when having a coordination number of nine and at least includes Y; and
a fifth subcomponent including an oxide of R2, wherein R2 is at least one kind selected from a second element group composed of rare-earth elements having an effective ionic radius of 108 pm to 113 pm when having a coordination number of nine;
wherein when assuming the effective ionic radius of Y included in said first element group is ry and the effective ionic radius of rare-earth elements composing said second element group is r2, said second element group is composed so that a ratio of ry and r2 (r2/ry) satisfies a relationship of $1.007<(r2/ry)<1.05$.

63. The electronic device as set forth in claim 62, wherein when assuming the effective ionic radius of Y included in said first element group is ry and the effective ionic radius of rare-earth elements composing said second element group is r2, said second element group is composed so that a ratio of ry and r2 (r2/ry) satisfies a relationship of $1.007<(r2/ry)<1.03$.

64. The electronic device as set forth in claim 62, wherein a ratio of the fifth subcomponent to 100 mol of said main component is a ratio of Y or more.

65. The electronic device as set froth in claim 62, wherein a ratio of a total of the fourth subcomponent and the fifth subcomponent to 100 mol of said main component is 10 mol or less, and wherein the number of mole of the fourth subcomponent and the fifth subcomponent is a ratio of R1 and R2 alone.

66. The electronic device as set forth in claim 62, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

67. An electronic device comprising a dielectric layer composed of a dielectric ceramic composition, wherein:

said dielectric ceramic composition comprises a main component including barium titanate;

a fourth subcomponent including an oxide of R1, wherein R1 is at least one kind selected from a first element group composed of rare-earth elements having an effective ionic radius of less than 108 pm when having a coordination number of nine; and a fifth subcomponent including an oxide of R2, wherein R2 is at least one kind selected from a second element group composed of rare-earth elements having an effective ionic radius of 108 pm to 113 pm when having a coordination number of nine and at least includes Tb;

wherein a diffusion part at least including said R1 and R2 exists inside respective dielectric particles composing said dielectric ceramic composition;

wherein said dielectric particles comprise a ferroelectric part substantially not including said R1 and R2 and a diffusion part existing around the ferroelectric part; a grain boundary segregation part exists around the diffusion part;

said diffusion part and grain boundary segregation part includes at least said R1 and R2; and when assuming respective existential quantities of R1 and R2 in said diffusion part are MAR1 and MAR2 and respective existential quantities of R1 and R2 in said grain boundary segregation part are MBR1 and MBR2, relationships of (MBR1/MBR2)>1 and (MAR1/MAR2)<(MBR1/MBR2).

68. The electronic device as set forth in claim 67, wherein when assuming the effective ionic radius of the rare-earth elements composing said first element group is r1 and the effective ionic radius of Tb included in said second element group is rtb, said first element group is composed so that a ratio of r1 and rtb (rtb/r1) satisfies a relationship of 1.018<(rtb/r1)<1.062.

69. The electronic device as set forth in claim 67, wherein when assuming the effective ionic radius of the rare-earth elements composing said first element group is r1 and the effective ionic radius of Tb included in said second element group is rtb, said first element group is composed so that a ratio of r1 and rtb (rtb/r1) satisfies a relationship of 1.018<(rtb/r1)<1.022.

70. The electronic device as set forth in claim 67, wherein a ratio of a total of the fourth subcomponent and the fifth subcomponent to 100 mol of said main component is 10 mol or less, and wherein the number of mole of the fourth subcomponent and the fifth subcomponent is a ratio of R1 and R2 alone.

71. The electronic device as set forth in claim 65, wherein ratios of the respective subcomponents to 100 mol of said main component are 0.1 to 10 mol in the fourth subcomponent, wherein the number of mole of the fourth subcomponent is a ratio of R1 alone and 0.1 to 10 mol in the fifth subcomponent, and wherein the number of mole of the fifth subcomponent is a ratio of R2 alone.

* * * * *